United States Patent
Taniguchi et al.

(10) Patent No.: US 7,436,982 B2
(45) Date of Patent: Oct. 14, 2008

(54) VEHICLE SURROUNDINGS MONITORING APPARATUS

(75) Inventors: Fuminori Taniguchi, Shioya-gun (JP); Hobuharu Nagaoka, Nasu-gun (JP); Takayuki Tsuji, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 708 days.

(21) Appl. No.: 11/150,732

(22) Filed: Jun. 10, 2005

(65) Prior Publication Data

US 2005/0276450 A1 Dec. 15, 2005

(30) Foreign Application Priority Data

Jun. 14, 2004 (JP) ............... 2004-175668

(51) Int. Cl.
G06K 9/00 (2006.01)
G06K 9/36 (2006.01)
H04N 7/18 (2006.01)

(52) U.S. Cl. .................. 382/104; 382/291; 348/148

(58) Field of Classification Search ........... 382/103, 382/104, 209, 216, 282, 291; 348/148, 149
See application file for complete search history.

(56) References Cited

U.S. PATENT DOCUMENTS

| | | | | |
|---|---|---|---|---|
| 5,555,312 | A * | 9/1996 | Shima et al. ............... | 382/104 |
| 6,531,959 | B1 * | 3/2003 | Nagaoka et al. ............ | 340/435 |
| 7,006,667 | B2 * | 2/2006 | Akutagawa ................ | 382/104 |
| 2003/0091228 | A1 * | 5/2003 | Nagaoka et al. ............ | 382/154 |
| 2003/0137593 | A1 * | 7/2003 | Watanabe et al. ........... | 348/274 |
| 2003/0138133 | A1 * | 7/2003 | Nagaoka et al. ............ | 382/104 |
| 2004/0032971 | A1 * | 2/2004 | Nagaoka et al. ............ | 382/103 |
| 2004/0183906 | A1 | 9/2004 | Nagaoka et al. | |

FOREIGN PATENT DOCUMENTS

| | | |
|---|---|---|
| DE | 10 2004 012 811 A1 | 11/2004 |
| JP | 11-328364 | 11/1999 |
| JP | 2001-006096 | 1/2001 |
| JP | 2001-028100 | 1/2001 |
| JP | 2001-351193 | 12/2001 |
| JP | 2001-351200 | 12/2001 |
| JP | 2003-016429 | 1/2003 |
| JP | 2003-134508 | 5/2003 |
| JP | 2003-216937 | 7/2003 |

* cited by examiner

*Primary Examiner*—Colin LaRose
(74) *Attorney, Agent, or Firm*—Carrier, Blackman & Associates, P.C.; Joseph P. Carrier; William D. Blackman

(57) ABSTRACT

A vehicle surroundings monitoring apparatus, includes: an infrared imaging device that captures an image; a binarized object extraction device that extracts a binarized object by binarizing the image; an extraction region setting device that sets, as an extraction region, a region adjacent to one of an upper end and a lower end of the binarized object extracted by the binarized object extraction device; a search region setting device that sets a search region around the extraction region; a similar object extraction device that, when an object having a shape similar to that of the object in the extraction region is present in the search region, extracts the object in the search region as a similar object; and an identical object determination device that determines whether or not the object in the extraction region and the similar object in the search region are identical.

13 Claims, 17 Drawing Sheets

THE OBJECTS IN THE FRAMES P1 TO P4 ARE TARGETED OBJECTS

VEHICLE SURROUNDINGS MONITORING APPARATUS

BACKGROUND OF THE INVENTION

1. Field of the Invention

The present invention relates to a vehicle surroundings monitoring apparatus in which object extraction is carried out by subjecting an image to a binarization processing.

Priority is claimed on Japanese Patent Application No. 2004-175668, filed Jun. 14, 2004, the content of which is incorporated herein by reference.

2. Description of Related Art

Vehicle surroundings monitoring apparatuses have been employed in which objects that may collide with the vehicle, such as pedestrians, are extracted from a picture around the vehicle captured by an infrared camera. More specifically, in the device, the captured infrared image is subjected to a binarization processing, and an area (binarized object) in which bright portions are concentrated is searched for. Then, it is determined whether or not the area is a head portion of a pedestrian by using the aspect ratio (ratio of length to width) and the sufficiency rate of the binarized object, and further calculating the distance between the vehicle and the binarized object using the actual surface area and the position of the centroid in the image. If the area of the head portion of a pedestrian is determined, an area which contains the body of the pedestrian is determined and set. These areas are displayed to be distinguished from the other regions of the image. In this manner, the position of the entire body of the pedestrian in the infrared image is determined, and this information is displayed for the driver so as to effectively assist the vision of the driver (refer to Japanese Unexamined Patent Application, First Publication No. H11-328364, for example).

However, when a vehicle is traveling, due to the influence in change in the geometry of a road ahead, or the pitching of the vehicle, the shape of the binarized object does not necessarily reflect the actual shape of the object.

Consequently, in order to provide an effective visual assistance to the driver, in addition to extracting pedestrians based on physical characteristics that can be distinguished relatively easily, such as a shape identification based on the presence of an object that has an equivalent height as a human height in the object image, a shape identification based on the presence of the head and the torso, and a shape identification based only on the head, or the like, that are used in device described in Japanese Unexamined Patent Application, First Publication No. H11-328364, it is necessary to extract artificial structures, such as road constructions, from a binarized object and then distinguish between objects other than pedestrians and pedestrians.

SUMMARY OF THE INVENTION

The present invention was conceived in view of the above-described background, and an object thereof is to provide a vehicle surroundings monitoring apparatus that can determine a binarized object having an indefinite shape extracted from an infrared image appropriately, and can accurately recognize objects around the vehicle.

In order to address the above-described issues, a vehicle surroundings monitoring apparatus according to a first aspect of the present invention is a vehicle surroundings monitoring apparatus, including: an infrared imaging device that captures an image; a binarized object extraction device that extracts a binarized object by binarizing the image; an extraction region setting device that sets, as an extraction region, a region adjacent to one of an upper end and a lower end of the binarized object extracted by the binarized object extraction device; a search region setting device that sets a search region around the extraction region; a similar object extraction device that, when an object having a shape similar to that of the object in the extraction region is present in the search region, extracts the object in the search region as a similar object; and an identical object determination device that determines whether or not the object in the extraction region and the similar object in the search region are identical.

In the vehicle surroundings monitoring apparatus having the above-described constitution, the binarized object extraction device extracts a binarized object from the image obtained by the infrared imaging device, and the extraction region setting device sets, as an extraction region, the region adjacent to one of the upper end and the lower end of the binarized object extracted by the binarized object extraction device. Then, when an object having a similar shape as the object in the extraction region set by the extraction region setting device is present in the search region set by the search region setting device around the extraction region, the similar object extraction device extracts that object in the search region having the similar shape as a similar object. Since a determination as to whether or not the object in the extraction region and the similar object in the search region are identical is made by the identical object determination device, continuous objects having the same shape can be recognized when the binarized object or an object in the extraction region in the upward and the downward direction thereof has the similar shape as that of an object in the search region.

According to a second aspect of the present invention, in the vehicle surroundings monitoring apparatus according to the first aspect, the vehicle surroundings monitoring apparatus further includes another infrared imaging device; and a distance calculating device that, based on two images captured by the two infrared imaging devices, calculates a distance to the object contained in the images, wherein the identical object determination device determines that the object in the extraction region and the similar object in the search region are identical when a distance to the object in the extraction region is the same as a distance to the similar object in the search region.

In the vehicle surroundings monitoring apparatus having the above-described constitution, when the distance to the object in the extraction region calculated by the distance calculating device that calculates the distance to an object from the parallax between the right image and the left image, and the distance to the similar object in the search region that is also calculated by the distance calculating device are the same, then it is determined that the objects are identical. Thus, a determination as of whether or not the object in the extraction region and the similar object in the search region are identical can be made more accurately since the identical object determination device determines that the object in the extraction region and the similar object in the search region are identical.

According to a third aspect of the present invention, in the vehicle surroundings monitoring apparatus according to the first aspect, the search region setting device sets a direction to search the search region to one of an upward direction, a downward direction, and upward and downward directions of the extraction region.

In the vehicle surroundings monitoring apparatus having the above-described constitution, the search region setting device sets the search region to one of the upward direction, the downward direction, and the upward and the downward direction of the extraction region, and the identical object determination device determines whether or not the binarized object in the extraction region and the similar object in the search region that has been set to one of the upward direction, the downward direction, and the upward and the downward direction of the extraction region are identical. Thus, continuous objects having the same shape arranged in the vertical direction can be recognized when the binarized object in the extraction region and the similar object in the search region that has been set to one of the upward direction, the downward direction, and the upward and the downward direction of the extraction region are similar.

According to a fourth aspect of the present invention, in the vehicle surroundings monitoring apparatus according to the first aspect, the search region setting device sets a plurality of search regions in the same direction, and the identical object determination device, when the ratio of the number of images from which the similar object is extracted is equal to or higher than a predetermined ratio, determines that the object in the extraction region and the similar objects in the search regions are identical.

In the vehicle surroundings monitoring apparatus having the above-described constitution, the search region setting device sets the plurality of search regions around the extraction region, and the similar object extraction device extracts the similar object. In this process, when the ratio of the number of images from which the similar object is extracted is equal to or higher than the predetermined ratio, the identical object determination device determines that the object in the extraction region and the similar objects in the plurality of search regions set around the extraction region are identical even when the similar objects are not present in all of the search regions. Thus, continuous objects having the same shape can be recognized when the object in the extraction region and the objects in the search regions have the similar shape.

According to a fifth aspect of the present invention, in the vehicle surroundings monitoring apparatus according to the first aspect, the extraction region setting device sets a right extraction region having a horizontal coordinate of a right side end of the binarized object extracted by the binarized object extraction device and a left extraction region having a horizontal coordinate of a left side end of the binarized object, the search region setting device sets the search regions around each of the right extraction region and the left extraction region, the similar object extraction device, when an object having a similar shape as an object in the left extraction region is present within the search region corresponding to the left extraction region, or when an object having a similar shape as the object in the right extraction region is present within the search region corresponding to the right extraction region, extracts the object having the similar shape in the search region as a similar object, and the identical object determination device determines whether or not the object in the left extraction region and the similar object in the search region corresponding to the left extraction region are identical, or whether or not the object in the right extraction region and the similar object in the search region corresponding to the right extraction region are identical.

In the vehicle surroundings monitoring apparatus having the above-described constitution, the extraction region setting device, as extraction regions, sets the right and the left extraction region each containing a region corresponding to the right side and the left side of the binarized object, respectively. Then, when an object having a shape similar to that of the object in the extraction regions set by the extraction region setting device is present in each search region corresponding to the right search region and the left search region set by the search region setting device, the similar object extraction device extracts that object in the search regions having the similar shape as a similar object. In this manner, since the identical object determination device determines whether or not an object in either the right extraction region or the left extraction region and the similar object in the search region corresponding to that extraction region are identical, continuous objects having the same shape in either the right end or the left end can be recognized when the object in either the right extraction region or the left extraction region and the similar object in the search region corresponding to that extraction region are similar.

According to a sixth aspect of the present invention, in the vehicle surroundings monitoring apparatus according to the first aspect, the vehicle surroundings monitoring apparatus further includes a pedestrian recognition device that excludes a region that contains the object that has been determined as the identical object by the identical object determination device, and recognizes a pedestrian from a binarized object in a remaining region.

In the vehicle surroundings monitoring apparatus having the above-described constitution, the pedestrian recognition device excludes a region that contains the object that has been determined as the identical object by the identical object determination device, and recognizes a pedestrian from a binarized object in the remaining region. In this manner, a pedestrian can be recognized from remaining objects other than the continuous objects having the same shape that cannot be a pedestrian.

According to a seventh aspect of the present invention, in the vehicle surroundings monitoring apparatus according to the sixth aspect, the vehicle surroundings monitoring apparatus further includes a warning output device that issues a warning concerning the pedestrian recognized by the pedestrian recognition device.

In the vehicle surroundings monitoring apparatus having the above-described constitution, since the warning issuing device issues a warning concerning the pedestrian recognized by the pedestrian recognition device, the presence of the pedestrian around the vehicle can be notified to the driver of the vehicle.

An eighth aspect of the present invention is a vehicle surroundings monitoring apparatus, including: an infrared imaging device that captures an image; a binarized object extraction device that extracts a binarized object by binarizing the image; a pedestrian recognition device that recognize a pedestrian in the binarized object extracted by the binarized object extraction device; an extraction region setting device that sets, as an extraction region, a region adjacent to one of an upper end and a lower end of the binarized object extracted by the binarized object extraction device; a search region setting device that sets a search region around the extraction region; a similar object extraction device that, when an object having a similar shape as the object in the extraction region is present in the search region, extracts the object in the search region and sets the object as a similar object; and an identical object determination device that determines whether or not the object in the extraction region and the similar object in the search region are identical.

In the vehicle surroundings monitoring apparatus having the above-described constitution, the binarized object extracts a binarized object from the image obtained by the infrared imaging device, and the pedestrian recognition device recognize a pedestrian from the extracted binarized object. The extraction region setting device then sets, as an extraction region, the region adjacent to one of the upper end and the lower end of the binarized object that has been recognized as a pedestrian by the pedestrian recognition device. Then, if an object having a similar shape as the object in the extraction region set by the extraction region setting device is present in the search region set by the search region setting device around the extraction region, the similar object extraction device extracts that object in the search region having the similar shape as a similar object. Since a determination as to whether or not the object in the extraction region and the similar object in the search region are identical is made by the identical object determination device, continuous objects having the same shape can be recognized among objects that have previously been determined as pedestrians by the pedestrian recognition device when the binarized object or an object in the extraction region in the upward and the downward direction thereof has the similar shape as that of an object in the search region.

According to a ninth aspect of the present invention, in the vehicle surroundings monitoring apparatus according to the eighth aspect, the vehicle surroundings monitoring apparatus includes two of the infrared imaging devices, and a distance calculating device that, based on two images captured by the two infrared imaging devices, calculates a distance to the object contained in the images, and when a distance to the object in the extraction region is the same as a distance to the similar object in the search region, the identical object determination device determines that the object in the extraction region and the similar object in the search region are identical.

In the vehicle surroundings monitoring apparatus having the above-described constitution, when the distance to the object in the extraction region calculated by the distance calculating device that calculates the distance to a binarized object from the parallax between the right image and the left image, and the distance to the similar object in the search region that is also calculated by the distance calculating device are the same, the identical object determination device determines that the object in the extraction region and the similar object in the search region are identical. Thus, a determination as of whether or not the object in the extraction region and the similar object in the search region are identical can be made more accurately since the identical object determination device determines that the object in the extraction region and the similar object in the search region are identical.

According to a tenth aspect of the present invention, in the vehicle surroundings monitoring apparatus according to the sixth aspect, the search region setting device sets the search region to one of an upward direction, a downward direction, and upward and downward directions of the extraction region.

In the vehicle surroundings monitoring apparatus having the above-described constitution, the search region setting device sets the search region to one of the upward direction, the downward direction, and the upward and the downward directions of the extraction region, and the identical object determination device determines whether or not the binarized object in the extraction region and the similar object in the search region that has been set to one of the upward direction, the downward direction, and the upward and the downward directions of the extraction region are identical. Thus, continuous objects having the same shape arranged in the vertical direction can be recognized among objects that have previously been determined as pedestrians by the pedestrian recognition device when the binarized object in the extraction region and the similar object in the search region that has been set to one of the upward direction, the downward direction, and the upward and the downward directions of the extraction region are similar.

According to an eleventh aspect of the present invention, in the vehicle surroundings monitoring apparatus according to the sixth aspect, the search region setting device sets a plurality of the search regions in the same direction, and when a similar object is extracted by the similar object extraction device from a predetermined ratio of the plurality of search regions or higher, the identical object determination device determines that the object in the extraction region and the similar object in the search region are identical.

In the vehicle surroundings monitoring apparatus having the above-described constitution, the search region setting device sets the plurality of search regions around the extraction region, and the similar object extraction device extracts the similar object. In this process, when the ratio of the number of images from which the similar object is extracted is equal to or higher than the predetermined ratio, the identical object determination device determines that the object in the extraction region and the similar objects in the plurality of search regions set around the extraction region are identical even when the similar objects are not present in all of the search regions. Thus, continuous objects having the same shape can be recognized among objects that have previously been determined as pedestrians by the pedestrian recognition device when the object in the extraction region and the objects in the search regions have the similar shape.

According to a twelfth aspect of the present invention, in the vehicle surroundings monitoring apparatus according to the sixth aspect, the extraction region setting device sets a right extraction region and a left extraction region as extraction regions, each of the right extraction region and the left extraction region respectively having a horizontal coordinate of the right-side end and the left-side end of the binarized object, that has been recognized as the pedestrian by the pedestrian recognition device, the search region setting device sets the search regions around each of the right extraction region and the left extraction region, the similar object extraction device, when an object having a similar shape as an object in the left extraction region is present within the search region corresponding to the left extraction region, or when an object having a similar shape as the object in the right extraction region is present within the search region corresponding to the right extraction region, extracts the object having the similar shape in the search region as a similar object, and the identical object determination device determines whether or not the object in the left extraction region and the similar object in the search region corresponding to the left extraction region are identical, or whether or not the object in the right extraction region and the similar object in the search region corresponding to the right extraction region are identical.

In the vehicle surroundings monitoring apparatus having the above-described constitution of the extraction region setting device, a right extraction region and a left extraction region are set in the positions corresponding to the right end and the left end of the binarized object as extraction regions in a region adjacent to one of an upper end and a lower end of the binarized object that has been recognized as a pedestrian by the pedestrian recognition device. Then, when an object having a similar shape as the object in the extraction region set by the extraction region setting device is present in each search region corresponding to the right search region and the left search region set by the search region setting device, the similar object extraction device extracts that object in the search region having the similar shape as a similar object. In this manner, since the identical object determination device determines whether or not an object in either the right extraction region or the left extraction region and the similar object in the search region corresponding to that extraction region are identical, continuous objects having the same shape in either the right end or the left end can be recognized among objects that have previously been determined as pedestrians by the pedestrian recognition device when the object in either the right extraction region or the left extraction region and the similar object in the search region corresponding to that extraction region are similar.

According to a thirteenth aspect of the present invention, in the vehicle surroundings monitoring apparatus according to the eighth aspect, the vehicle surroundings monitoring apparatus further includes a warning issuing device that excludes a region that contains the object that has been determined as the identical object by the identical object determination device and issues a warning concerning the pedestrian that is present in a remaining region.

In the vehicle surroundings monitoring apparatus having the above-described constitution, the warning issuing device excludes a region in which the object that is determined as the same object by the identical object determination device and cannot be a pedestrian, and issues a warning concerning the pedestrian that is present in the remaining region. Thus, it is possible to notify the driver of the vehicle only of the presence of the pedestrian around the vehicle.

According to vehicle surroundings monitoring apparatus of the first aspect of the present invention, when the binarized object or an object in the extraction region in the upward and the downward direction thereof has the similar shape as that of an object in the search region, continuous objects having the same shape can be recognized.

Accordingly, since a series of objects having the same shape is characteristic only to an artificial structure, a binarized object having an indefinite shape extracted from an infrared image is accurately identified. Accordingly, in a vehicle surroundings monitoring apparatus, the effect of realizing an accurately and easily extracts an artificial structure from objects around the vehicle can be achieved.

According to vehicle surroundings monitoring apparatus of the second aspect of the present invention, a determination of whether or not the binarized object in the extraction region and the similar object in the search region are identical can be made more accurately.

Accordingly, the effect of an enhanced accuracy of extracting artificial structures from objects around the vehicle can be achieved.

According to vehicle surroundings monitoring apparatus of the third aspect of the present invention, when the binarized object in the extraction region and the similar object in the search region that has been set to one of the upward direction, the downward direction, and the upward and the downward directions of the extraction region are similar, continuous objects having the same shape arranged in the vertical direction can be recognized.

Accordingly, the effect of realizing a vehicle surroundings monitoring apparatus that accurately identifies a binarized object having an indefinite shape extracted from an infrared image, and is capable of extracting continuous artificial structures having the same shape in the vertical direction, e.g., utility poles, easily and accurately from-objects around the vehicle can be achieved.

According to vehicle surroundings monitoring apparatus of the fourth aspect of the present invention, even when the similar objects are not present in all of the search regions, continuous objects having the same shape can be recognized when a binarized object in the extraction region and a binarized object in the search region are similar.

Accordingly, continuous artificial structures having the same shape can be extracted even from an object the entire image of which has not been taken by the infrared imaging device due to the influence of the driving state of the vehicle or the environment around the object, and thus the accuracy of extracting artificial structures from objects around the vehicle can be enhanced.

According to vehicle surroundings monitoring apparatus of the fifth aspect of the present invention, by comparing either the right extraction region or the left extraction region and the search region corresponding to that extraction region, continuous objects having the same shape in either the right end or the left end can be recognized when the binarized object in either the right extraction region or the left extraction region and the binarized object in the search region corresponding to the extraction region are similar.

Accordingly, continuous artificial structures having the same shape can be extracted even from an object that is present only in either the right side or the left side of the images taken by the infrared imaging device due to the influence of the driving state of the vehicle or the environment around the object.

According to vehicle surroundings monitoring apparatus of the sixth aspect of the present invention, a pedestrian can be recognized from remaining objects other than the continuous objects having the same shape.

Accordingly, a vehicle surroundings monitoring apparatus can be realized which can accurately determine a binarized object having an indefinite shape extracted from an infrared image, exclude an artificial structure in which a series of objects having the same shape are excluded beforehand, and extract pedestrians accurately and easily from the remaining objects around the vehicle.

According to vehicle surroundings monitoring apparatus of the seventh aspect of the present invention, the presence of the pedestrian around the vehicle can be notified to the driver of the vehicle.

Accordingly, it is possible to notify the driver of the vehicle of the pedestrian.

According to vehicle surroundings monitoring apparatus of the eighth aspect of the present invention, continuous objects having the same shape can be recognized among objects that have previously been determined as pedestrians by the pedestrian recognition device when the binarized object or an object in the extraction region in the upward and the downward direction thereof has the similar shape as that of an object in the search region.

Accordingly, since a series of objects having the same shape is characteristic only to an artificial structure, even when a binarized object having an indefinite shape extracted from an infrared image has been recognized as a pedestrian, an artificial objects determined from a series of objects having the same shape is excluded. Thus, a vehicle surroundings monitoring apparatus that can accurately and easily extracts a pedestrian from objects around the vehicle can be realized.

According to vehicle surroundings monitoring apparatus of the ninth aspect of the present invention, a determination of whether or not the binarized object in the extraction region and the similar object in the search region are identical can be made more accurately.

Accordingly, it is possible to enhance the accuracy of extracting a pedestrian from objects around the vehicle.

According to vehicle surroundings monitoring apparatus of the tenth aspect of the present invention, among objects that have previously been determined as pedestrians by the pedestrian recognition device, the binarized object in the extraction region and the similar object in the search region that has been set to one of the upward direction, the downward direction, and the upward and the downward directions of the extraction region are similar, continuous objects having the same shape arranged in the vertical direction can be recognized.

Thus, a binarized object having an indefinite shape extracted from an infrared image is accurately identified, and a vehicle surroundings monitoring apparatus that is capable of extracting continuous artificial structures having the same shape in the vertical direction, e.g., utility poles, from objects around the vehicle and can recognize a pedestrian easily and accurately from the remaining objects can be realized.

According to vehicle surroundings monitoring apparatus of the eleventh aspect of the present invention, by comparing either the right extraction region or the left extraction region and the search region corresponding to that extraction region, continuous objects having the same shape in either the right end or the left end can be recognized among objects that have previously been determined as pedestrians by the pedestrian recognition device when the binarized object in either the right extraction region or the left extraction region and the binarized object in the search region corresponding to the extraction region are similar.

In the vehicle surroundings monitoring apparatus having the above-described constitution, the search region setting device sets a plurality of search regions around the extraction region, and the similar object extraction device extracts a similar object. As a result, when the similar object is extracted from the predetermined ratio or higher of the plurality of search regions, the identical object determination device determines that the object in the extraction region and the plurality of the similar objects set around the extraction region in the search region are the same object even when similar objects are not present in all of the search regions. Thus, continuous objects having the same shape can be recognized among objects that have been determined as pedestrians by the pedestrian recognition device when the object in the extraction region and the object in the search region have the similar shapes.

According to vehicle surroundings monitoring apparatus of the twelfth aspect of the present invention, by comparing either the right extraction region or the left extraction region and the search region corresponding to that extraction region, continuous objects having the same shape in either the right end or the left end can be recognized among objects that have previously been determined as pedestrians by the pedestrian recognition device when the binarized object in either the right extraction region or the left extraction region and the binarized object in the search region corresponding to the extraction region are similar.

Accordingly, continuous artificial structures having the same shape can be excluded even from an object that is only present in either the right side or the left side of the images taken by the infrared imaging devices, and has been determined as a pedestrian by the pedestrian recognition device. Thus, a pedestrian can be accurately and easily extracted from the remaining objects, and accordingly, it is possible to enhance the accuracy of extracting a pedestrian from objects around the vehicle.

According to vehicle surroundings monitoring apparatus of the thirteenth aspect of the present invention, continuous objects having the same shape can be excluded, and it is possible to notify the driver of the vehicle only of the presence of the pedestrian around the vehicle.

Accordingly, unnecessary output of warning of continuous artificial structures having the same shape can be prevented, and the warning only about the pedestrian can be issued for the driver of the vehicle.

DETAILED DESCRIPTION OF THE INVENTION

Hereafter, various embodiments of the present invention will be described with reference to the drawings.

Overall Configuration

Figure 1:
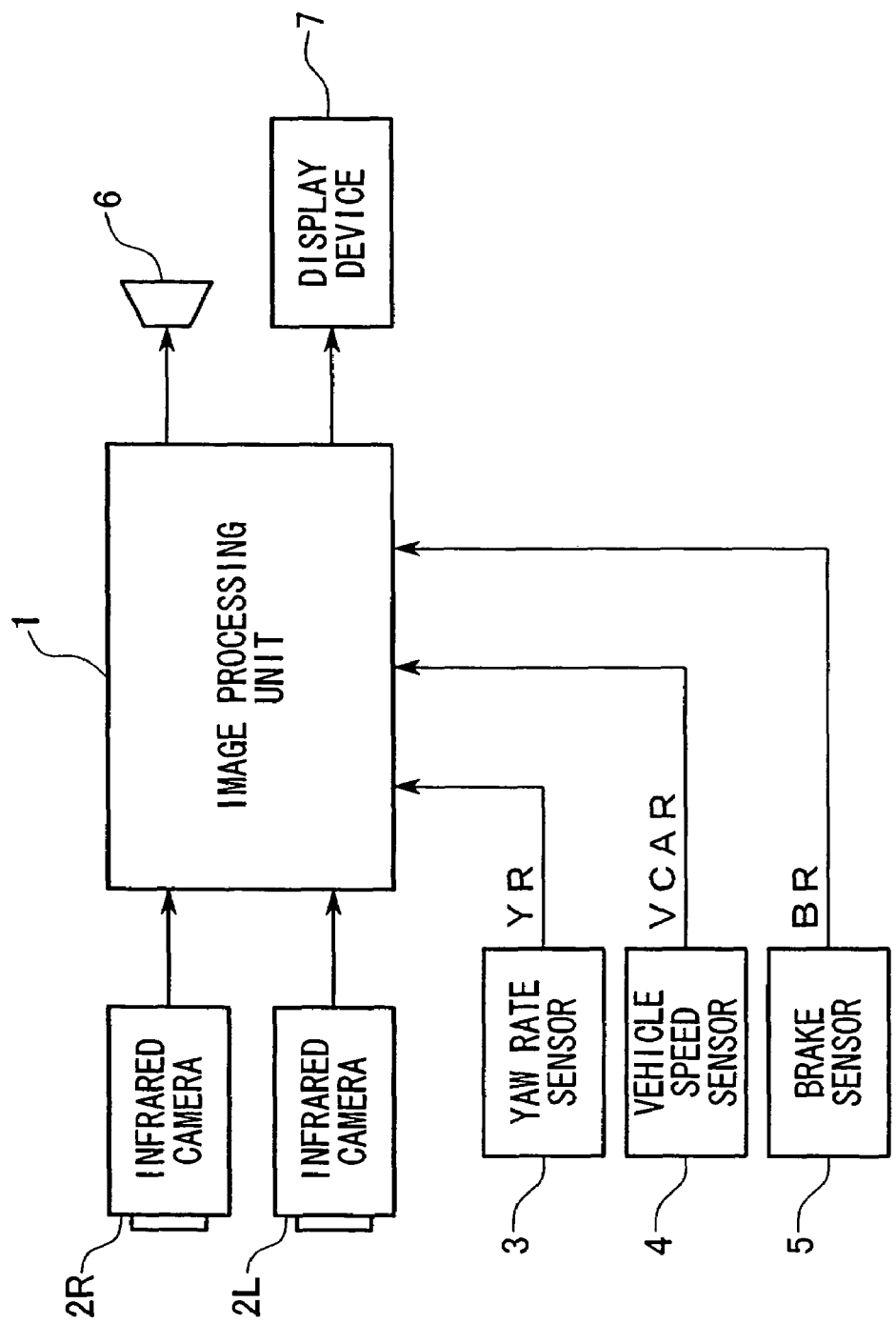
FIG. 1 is a block diagram showing a configuration of a vehicle surroundings monitoring apparatus according to an embodiment of the present invention.

FIG. 1 is a block diagram showing a configuration of a vehicle surroundings monitoring apparatus according to an embodiment of the present invention.

In FIG. 1, the reference numeral 1 indicates an image processing unit including a central processing unit (CPU) which controls the vehicle surroundings monitoring apparatus according to the embodiment. To the image processing unit 1, two infrared cameras 2R and 2L capable of detecting far infrared radiations, a yaw rate sensor 3 which detects the yaw rate of the vehicle, a vehicle speed sensor 4 which detects the traveling rate (vehicle speed) of the vehicle, and a brake sensor 5 for detecting brake operation are connected. In this configuration, the image processing unit 1 detects moving objects, such as pedestrians or animals, in front of the vehicle based on an infrared image around the vehicle and signals indicating the driving state of the vehicle, and issues an alarm when it is determined that the possibility of collision is high.

Also, to the image processing unit 1, a speaker 6 for generating an alarm sound, and an image display device 7, which displays images captured by the infrared cameras 2R and 2L and makes the driver of the vehicle recognize objects which may be hit by the vehicle, are connected. The image display device 7 may include, for instance, a display combined with a meter which shows the driving state of the vehicle in terms of numerical values, a navigation display provided with the console of the vehicle, and/or a heads up display (HUD) 7a which displays information at a position in the front window where the sight of the driver is not interfered with.

Moreover, the image processing unit 1 may further include an A/D converting circuit which converts input analog signals into digital signals, an image memory which stores digitalized image signals, a central processing unit (CPU) which performs various operations, a random access memory (RAM) which is used for storing data being operated by the CPU, a read only memory (ROM) which stores programs, tables, maps, etc., performed by the CPU, and output circuits through which driving signals for a speaker 6, display signals for the HUD 7a, etc., are output. Accordingly, signals sent from each of the infrared cameras 2R and 2L, the yaw rate sensor 3, the vehicle speed sensor 4 and the brake sensor 5 are converted into digital signals and are input in the CPU.

Figure 2:
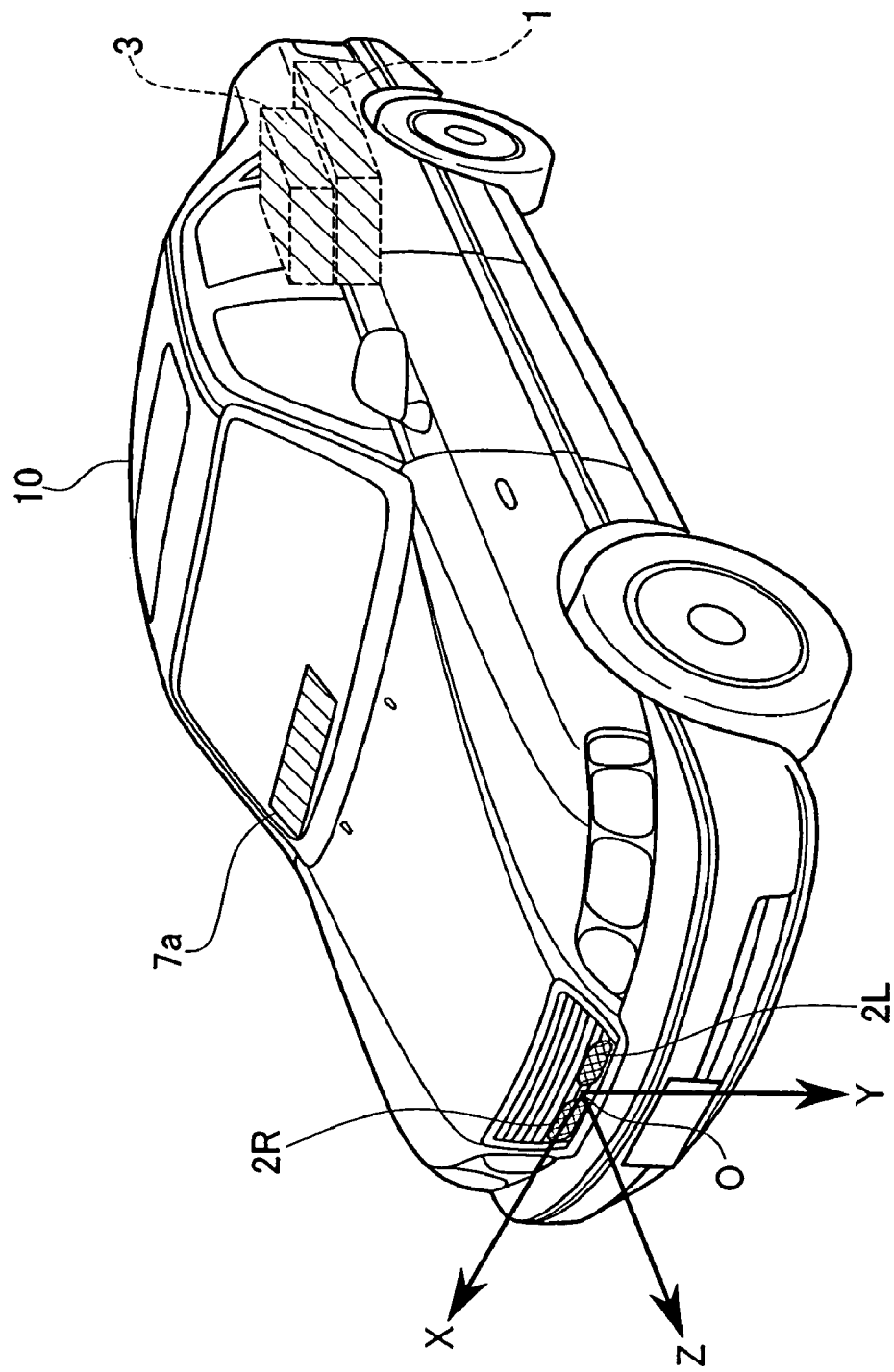
FIG. 2 is a diagram showing positions of an infrared ray camera, a sensor, a display, etc., installed to a vehicle according to the embodiment of the present invention.

Also, as shown in FIG. 2, the infrared cameras 2R and 2L are disposed at the front of a vehicle 10 at symmetrical positions with respect to the center of the vehicle 10 in the width direction so that the optical axis of each of the infrared cameras 2R and 2L become parallel to each other, and the height of the cameras 2R and 2L from the surface of the road become equal. Note that each of the infrared cameras 2R and 2L has characteristics such that the level of output signal becomes higher (i.e., luminance increases) as the temperature of an object increases.

Moreover, the display panel of the HUD 7a is disposed at a position of the windshield of the vehicle 10 where the sight of the driver is not interfered with the display panel.

Next, operation of the vehicle surroundings monitoring apparatus according to the embodiment of the present invention will be explained with reference to the accompanying drawings.

Object Detection And Warning Operation

Figure 3:
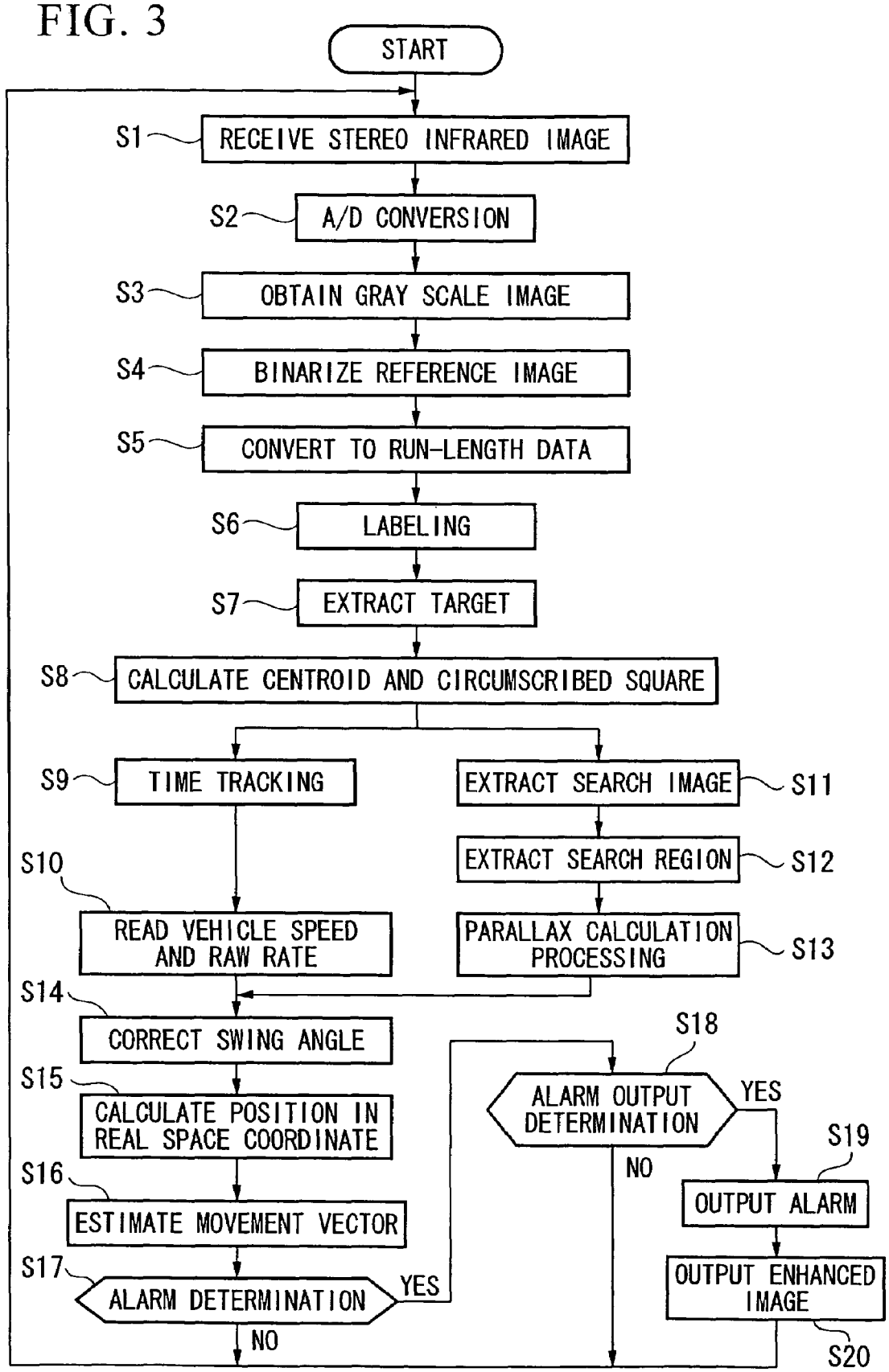
FIG. 3 is a flowchart showing an object detection and alarming operation of the vehicle surroundings monitoring apparatus according to the embodiment of the present invention.

FIG. 3 is a flowchart showing operations for detecting an object, such as a pedestrian, and for generating an alarm, which are performed in the image processing unit 1 of the vehicle surroundings monitoring apparatus according to the embodiment of the present invention.

In FIG. 3, first, the image processing unit 1 obtains an infrared image (step S1), which is output signals from the infrared cameras 2R and 2L, subjects the signals to an A/D conversion process (step S2), and stores the obtained gray scale image in an image memory (step S3). Note that in this embodiment, the right image is obtained by the infrared camera 2R, and the left image is obtained by the infrared camera 2L. Also, since the horizontal position of the same object in the right image and the left image is shifted from each other when the images are obtained, it is possible to calculate the distance to the object based on the shift (parallax).

After the gray scale image is obtained in step S3, the right image obtained by the infrared camera 2R is used as a reference image, and the image signals thereof is subjected to a binarization process, i.e., a process in which an area whose luminance is higher than a threshold value ITH is set to be "1" (white), and an area whose luminance is less than the threshold value ITH is set to be "0" (black) (step S4).

Figure 4A:
FIGS. 4A and 4B are diagrams showing a gray scale image obtained by using an infrared camera, and a binarized image thereof, respectively.
Figure 4B:

FIG. 4A shows a gray scale image obtained using the infrared camera 2R, and an image shown in FIG. 4B is obtained by subjecting the gray scale image shown in FIG. 4A to the binarization process. Note that in FIG. 4B, objects indicated in each of the frames P1 to P4 are objects (hereinafter also referred to as "high luminance areas"), which are shown in white in the displayed picture.

After binarized image data is obtained from the infrared image, a process is performed in which the obtained imaged data is converted into run-length data (step S5). Lines that are expressed by the run-length data are made up of areas at pixel level that have been determined to be white in the binarization process. Each of the lines has a width of one pixel in the y direction, and has a length corresponding to the length of a pixel which forms the run-length data in the x direction.

Next, objects in the image data converted to the run-length data are labeled (step S6) so that an extraction process for the objects may be carried out (step S7). That is, among the lines expressed as the run-length data, by regarding a line having a portion superimposed in the y direction as a single object, each of the high luminance areas P1 to P4 shown in FIG. 4B, for example, can be recognized as an object (binarized object).

After the extraction of the objects is completed, the centroid G, the surface area S, and the aspect ratio ASPECT (ratio of length to width) of a circumscribed square are calculated (step S8).

In this embodiment, the surface area S is calculated by assuming the run-length data of an object of label A as (x[i], y[i], run [i], A) (i=0, 1, 2, ... N−1), and accumulating the lengths of the run-length data (run [i]−1) for the same object (data of N run-lengths). Also, the coordinates (xc, yc) of the centroid G of the object A is calculated by multiplying the length of each run-length data (run [i]−1) by the coordinate x[i] or y[i] of each of the run-length data, further multiplying the resultant value by each other for the same object, and dividing the obtained value by the surface area S.

Moreover, the aspect ratio ASPECT is calculated as the ratio of Dy/Dx where Dy is the length of the circumscribed square for the object in the longitudinal direction, and Dx is the length of the circumscribed square for the same object in the transverse direction.

Note that since the run-length data is expressed as a pixel number (a coordinate number) (=run [i]), it is necessary to subtract one to obtain the actual length (=run [i]−1). Also, it is possible to substitute the position of the centroid of the circumscribed square for the position of the centroid G.

After the centroid, the surface area, and the aspect ratio of the circumscribed square of the binarized object are calculated, and a process for tracking the object over time, i.e., a process in which the same object is recognized every sampling period, is carried out (step S9). In the tracking process over time, objects A and B are extracted at time "k," which is obtained by discretization of time "t," an analog value, using the sampling period, for instance, and it is determined if objects C and D, which are extracted at time (k+1), are the same objects as the objects A and B, respectively. Then, when it is determined that the objects A and B and the objects C and D are the same objects, labels of the objects C and D are changed to labels A and B, respectively, to carry out the tracking process over time.

Also, the positional coordinates of each of the (centroid of) objects thus recognized are stored in memory as time series positional data, and are used for the subsequent operation process.

Note that the processes in steps S4 to S9 explained above are carried out for the binarized reference image (the right image in this embodiment).

Then, the vehicle speed VCAR detected by the vehicle speed sensor 4, and the yaw rate YR detected by the yaw rate sensor 3 are read, and the swinging angle θr of the vehicle 10 is calculated by subjecting the yaw rate YR to time integration (step S10).

On the other hand, a process for calculating the distance "z" between the object and the vehicle 10 (steps S11 to S13) is carried out simultaneously with the process of steps S9 and S10. Since this process for calculating the distance "z" takes a longer time period than the time required in steps S9 and S 10, it is carried out using longer time than steps S9 and S10 (about three times longer than the time for carrying out steps S1 to S10, for instance).

First, one of the objects which are tracked using the binarized image of the reference image (the right image), is selected to extract a search image R1 (in this embodiment, the whole area surrounded by the circumscribed square is referred to as the search image, and the circumscribed square of the search image is referred to as a "target frame") from the right image (step S11).

Then, a search region from which an image corresponding to the search image R1 (hereinafter also referred to as a "corresponding image") is searched, is set in the left image, and the corresponding image is extracted by carrying out a correlation operation (step S12). More specifically, a search region R2 is set in the left image in accordance with each apex coordinate of the search image R1, and a luminance difference summed value C (a, b), which indicates the degree of correlation with the search image R1 within the search region R2, is calculated. The area at which the summed value C (a, b) is minimum is extracted as the corresponding image. Note that the correlation operation is performed using the gray scale image, not the binarized image. Also, when there is a previous positional data for the same object, an area R2a, which is narrower than the search region R2, is set as a search region based on the previous positional data.

Since the search image R1 and the corresponding image R4, which corresponds to this object, are extracted in the reference image (the right image) and the left image, respectively, in step S12, the position of the centroid of the search image R1 and that of the corresponding image R4, and the parallax Δd (pixel number) are determined, and the distance "z" between the vehicle 10 and the object may be calculated using these parameters (in step S13).

Then, after the calculation of the swing angle θr in step S 10, and the calculation of the distance "z" between the object in step S13 are completed, a swing angle correction process for correcting the positional shift in the image caused by the swing of the vehicle 10 is carried out (in step S14). That is, if the (front portion of the) vehicle 10 is rotated in the left side direction at an angle of θr from time k to (k+1), the range of the image obtained through the cameras shifts in the x direction by Δx, and this shift is corrected in the swing angle correction process.

After the swing angle correction is completed for the real space coordinate, the coordinate (x, y) in the image and the distance "z" are converted into the coordinate (X, Y, Z) of the real space (in step S15).

In this embodiment, the coordinate (X, Y, Z) of the real space is defined as shown in FIG. 2 with the origin O which corresponds to the middle position of the install positions for the infrared cameras 2R and 2L (the position fixed to the vehicle 10). Note that in the following description, the coordinate after the swing angle correction process is expressed as (X, Y, Z).

After the swing angle correction is completed for the real space coordinate, an approximation straight line LMV, which corresponds to a vector of the relative movement between the object and the vehicle 10, is obtained from N sets of real space positional data (N=about 10, for example) subjected to the swing angle correction process, which is obtained within the monitoring period of ΔT for the same object, i.e., the time series data.

Then, the latest positional coordinate P(0)=(X(0), Y(0), Z(0)) and the positional coordinate P(N−1)=(X(N−1), Y(N−1), Z(N−1)) prior to (N−1) sampling (i.e., before time ΔT) are corrected to be on the positions on the approximation straight line LMV, and the positional coordinate after the correction, Pv(0)=(Xv(0), Yv(0), Zv(0)) and Pv(N−1)=(Xv(N−1), Yv(N−1), Zv(N−1)) are obtained.

In this manner, the relative movement vector may be obtained as a vector directed to Pv(0) from the positional coordinate Pv(N−1) (in step S16).

As explained above, according to the embodiment of the present invention, it becomes possible to more accurately estimate the possibility of collision of the vehicle against an object with decreased degree of errors in the positional detection by calculating an approximation straight line used for approximating a relative movement locus of the object with respect to the vehicle 10 based on plural sets (N) of data taken from the monitoring period ΔT.

After the relative movement vector is obtained in step S16, an alarm determination process in which the possibility of collision against the detected object is determined is carried out (in step S17). The alarm determination process will be described later in detail.

In step S17, when it is determined that there is no possibility of collision of the vehicle 10 against the detected object (i.e., NO in step S17), the process returns to step S1 to repeat the above-described processes.

Also, when it is determined that there is a possibility of collision of the vehicle 10 with the detected object (i.e., YES in step S17), the process proceeds to an alarm output determination process in step S18.

In step S18, it is determined whether the alarm output determination process should be carried out, i.e., whether the alarm output should be performed, by determining whether the driver of the vehicle 10 is operating a brake based on the output BR from the brake sensor 5 (in step S18).

When the driver of the vehicle 10 is operating the brake, the acceleration Gs (deceleration direction thereof is regarded as positive) generated by the braking operation is calculated. When the acceleration Gs is greater than a predetermined threshold value GTH, it is determined that the collision will be avoided by the operation of the brake, and the alarm output determination process is terminated (i.e., NO in step S18). Then, the process returns to step S1 to repeat the above-explained processes.

In this manner, no alarm is generated when an appropriate brake operation is performed, and hence, it becomes possible to avoid bothering the driver.

Also, when the acceleration Gs is equal to or less than the predetermined threshold value, or when the driver of the vehicle 10 is not operating the brake (i.e., YES in step S18), the process immediately proceeds to step S19 and sounds an alarm for the driver via sound, for instance, through the speaker 6, that the possibility of hitting an object is high. Moreover, the image obtained through the infrared camera 2R, for example, is output to the image display device 7 so that the approaching object may be displayed for the driver of the vehicle 10 as an enhanced image (in step S20).

Note that the predetermined threshold value GTH is a value which meets the conditions for stopping the vehicle 10 within the traveling distance shorter than the distance Zv(0) between the object and the vehicle 10 when the acceleration Gs during the braking operation is maintained as it is.

Warning Determination Process

Next, the alarm determination process in step S17 of the flowchart shown in FIG. 3 will be described in detail with reference to a flowchart shown in FIG. 5.

Figure 5:
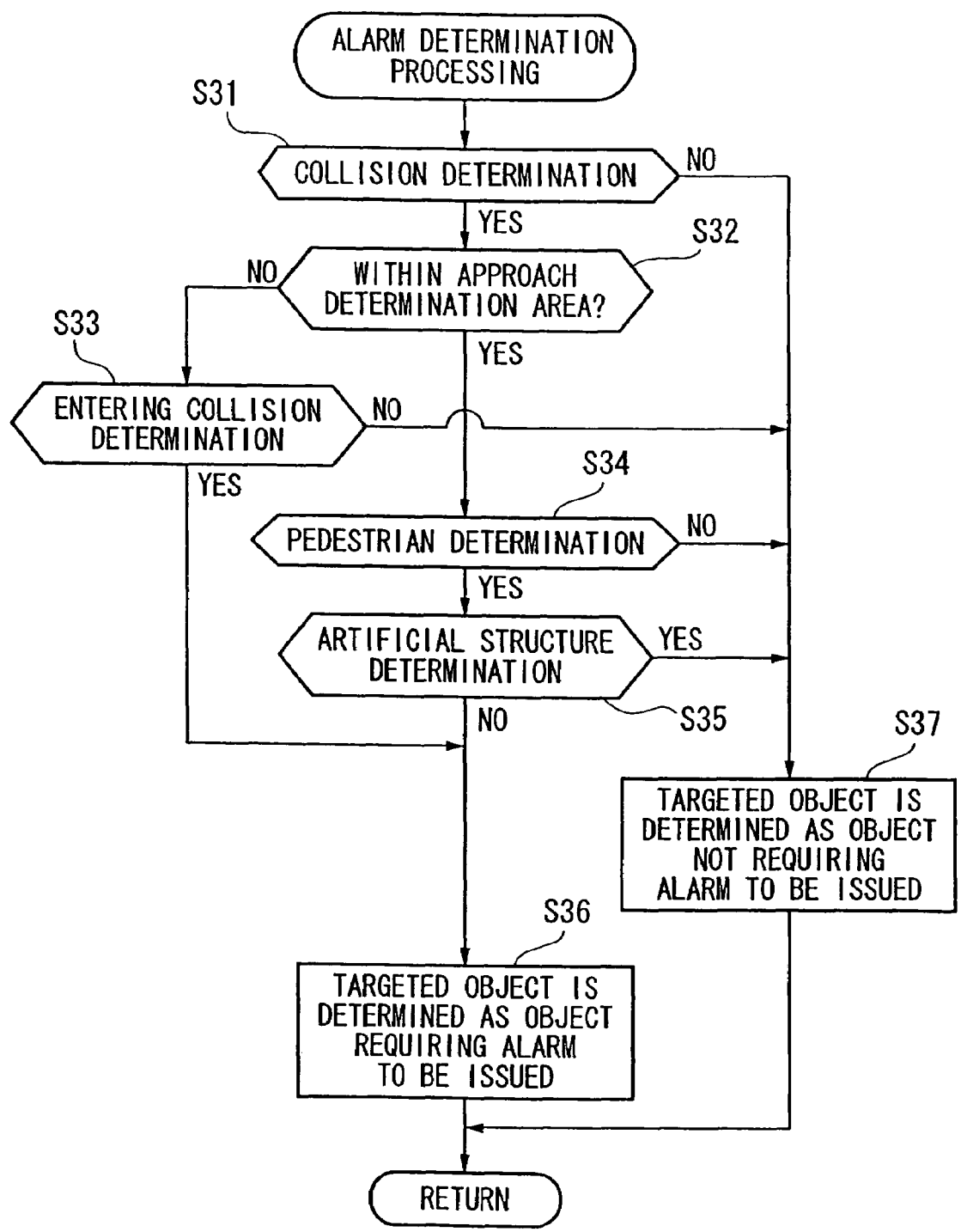
FIG. 5 is a flowchart showing an alarm determination operation according to the embodiment of the present invention.

FIG. 5 is a flowchart showing the operation of the alarm determination process according to the embodiment of the present invention.

Figure 6:
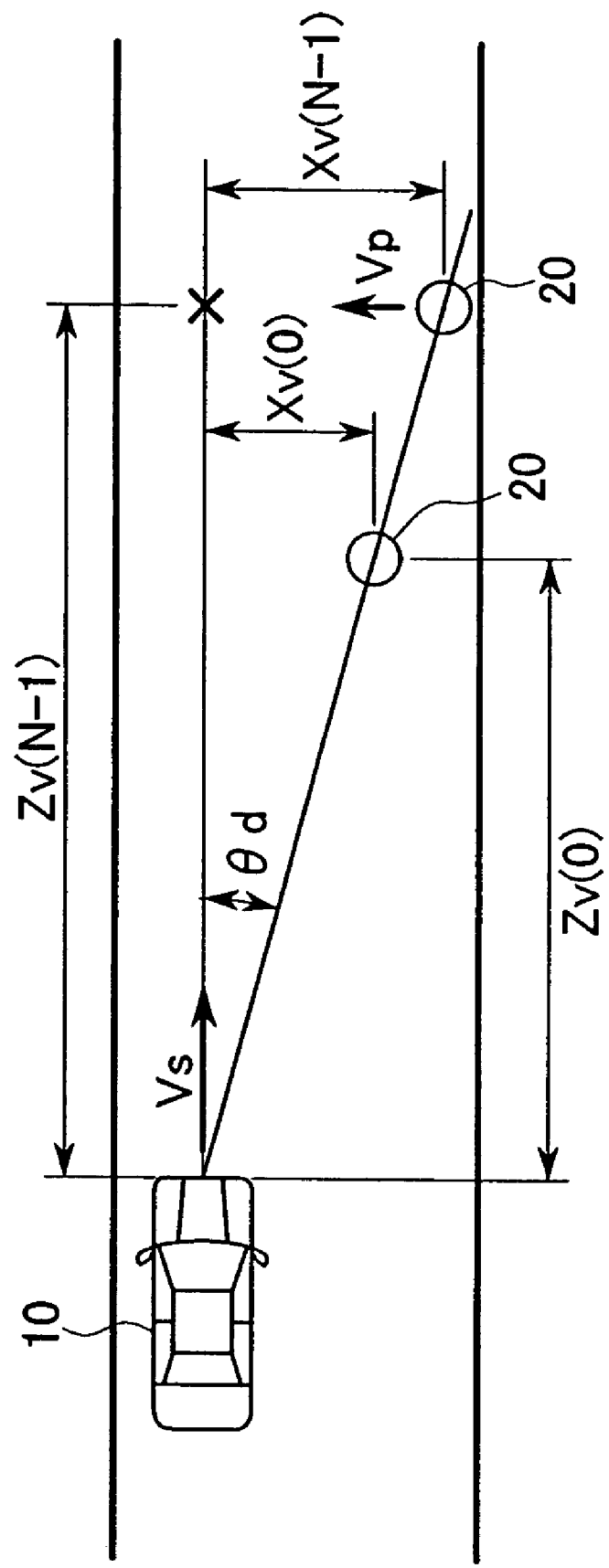
FIG. 6 is a diagram showing areas in which collision of a vehicle is likely to occur.

The alarm determination process is a process in which the possibility of collision of the vehicle 10 with a detected object is determined based on the following collision determination process, process for determining whether an object is within an approach determination area, entering collision determination process, pedestrian determination process, and artificial structure determination process. This will be explained using an example in which an object 20 proceeds at a speed Vp at an angle of almost 90° with respect to the traveling direction of the vehicle 10 as shown in FIG. 6.

In the flowchart shown in FIG. 5, the image processing unit 1 first carries out the collision determination process (in step S31). The collision determination process is a process in which, when the object 20 approaches the vehicle 10 from the distance Zv(N−1) to the distance Zv(0) within the time ΔT as shown in FIG. 6, the relative speed Vs with respect to the vehicle 10 in the Z direction is obtained, and it is determined whether the object will be hit by the vehicle 10 within a marginal time T assuming that the object 20 and the vehicle 10 keep moving while maintaining the relative speed Vs within the range of height H. Here, the marginal time T is provided so that the determination of the possibility of collision may be made before the estimated collision time with the margin of the time T. Accordingly, the marginal time T is set to be about 2 to 5 seconds, for example.

Figure 7:
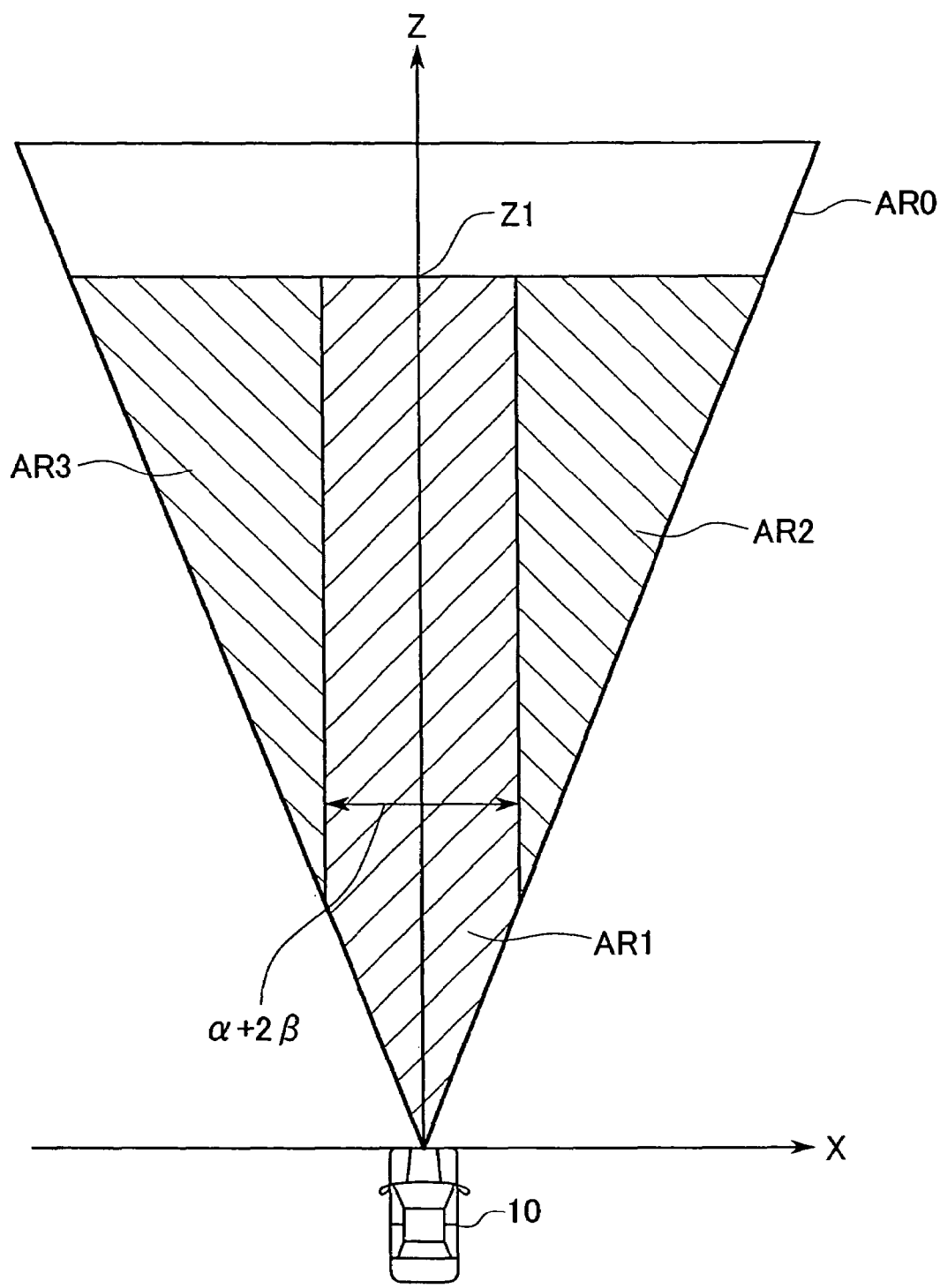
FIG. 7 is a diagram showing areas and sections in front of a vehicle according to the embodiment of the present invention.

Next, in step S31, when there is a possibility of collision between the vehicle 10 and the object within the marginal time T (i.e., YES in step S31), the image processing unit 1 carries out the process in which whether the object is in an approach determination area (in step S32) is determined in order to further improve the reliability in determination. The process for determining whether the object is in an approach determination area is a process in which it is determined whether the object is present in an approach determination area AR1 shown in FIG. 7 where the possibility of collision against the vehicle 10 is extremely high if the object remains there. As shown in FIG. 7, the approach determination area AR1 is defined to be an area within a triangle area AR0 indicated by the thick solid line which shows an area that can be monitored using the infrared cameras 2R and 2L, and is nearer to the vehicle 10 with respect to the line indicating Z1=Vs×T. The approach determination area AR1 corresponds to an area having a width of α+2β where α is the width of the vehicle 10 and β is a margin (about 50 to 100 cm, for example) added to both sides of the width α of the vehicle 10 as shown in FIG. 7. Note that the approach determination area AR1 also has the predetermined height H.

In step S32, when it is determined that no object is present in the approach determination area AR1 (i.e., NO in step S32), the image processing unit 1 carries out the entering collision determination process in which it is determined whether or not there is a possibility that an object will enter the approach determination area AR1 and be hit by the vehicle 10 (in step S33). As shown in FIG. 7, in the entering determination areas AR2 and AR3 that have greater absolute values of the X coordinate than that of the above-mentioned approach determination area AR1, and the entering collision determination process is a process in which it is determined whether an object present in the area AR2 or AR3 may move and enter the approach determination area AR1 and may be hit by the vehicle 10.

On the other hand, when an object is present in the approach determination area in step S32 (i.e., YES in step S32), the image processing unit 1 carries out the pedestrian determination process in which it is determined whether there is a possibility that the object is a pedestrian (in step S34). The pedestrian determination process executes a shape identification based on the presence of an object that has an equivalent height as a human height in the object image, a shape identification based on the presence of the head and the torso, or a shape identification based only on the head, or the like. If any of physical characteristics distinctive to a pedestrian is detected in the object image, that object is determined as the pedestrian and the object is excluded from objects requiring an alarm to be issued.

Furthermore, when it is determined that the object may be a pedestrian (YES in step S34), in order to further improve the reliability of the determination in step S34, the artificial structure determination process is performed to determine whether or not the object is an artificial structure or not (step S35) in order to exclude artificial structures the shapes of which are close to that of a pedestrian, such as an utility pole, in the gray scale image from the object determined to be a possible pedestrian. The artificial structure determining process will be described later.

Accordingly, in the above-mentioned step S33, when there is a possibility that an object will enter the approach determination area and collide with the vehicle 10 (i.e., YES in step S33), and when the object which is determined to be a possible pedestrian is not an artificial structure in step S35 (i.e., NO in step S35), the image processing unit 1 determines that there is a possibility of collision between the vehicle 10 and the detected object (i.e., the object is regarded as an object requiring an alarm to be issued) in step S36, and the process proceeds to step S18 (via YES in step S17) to perform the alarm output determination process (in step S18).

On the other hand, when it is determined that there is no possibility of collision between the vehicle 10 and the object within the marginal time T in the above-mentioned step S31 (i.e., NO in step S31), or when there is no possibility that the object will enter the approach determination area and collide with the vehicle 10 in step S33 (i.e., NO in step S33), or when it is determined in step S34 that there is no possibility that the object is a pedestrian (i.e., NO in step S34), or when the object determined to be a possible pedestrian in step S35 is an artificial structure (i.e., YES in step S35), the image processing unit 1 determines that there is no possibility of collision between the vehicle 10 and the object (i.e., the object is not an object requiring an alarm to be issued) in step S37, and the process returns to step S1 via NO in step S17 shown in FIG.

3. In this manner, the operation for detecting objects, such as a pedestrian, and issuing alarms is repeated.

Artificial Structure Determining Process

Next, the artificial structure determining process of step S35 in the flowchart shown in FIG. 5 will be explained in further detail with reference to a flowchart shown in FIG. 8 and schematic diagrams shown in FIG. 9 to FIG. 16.

Figure 8:
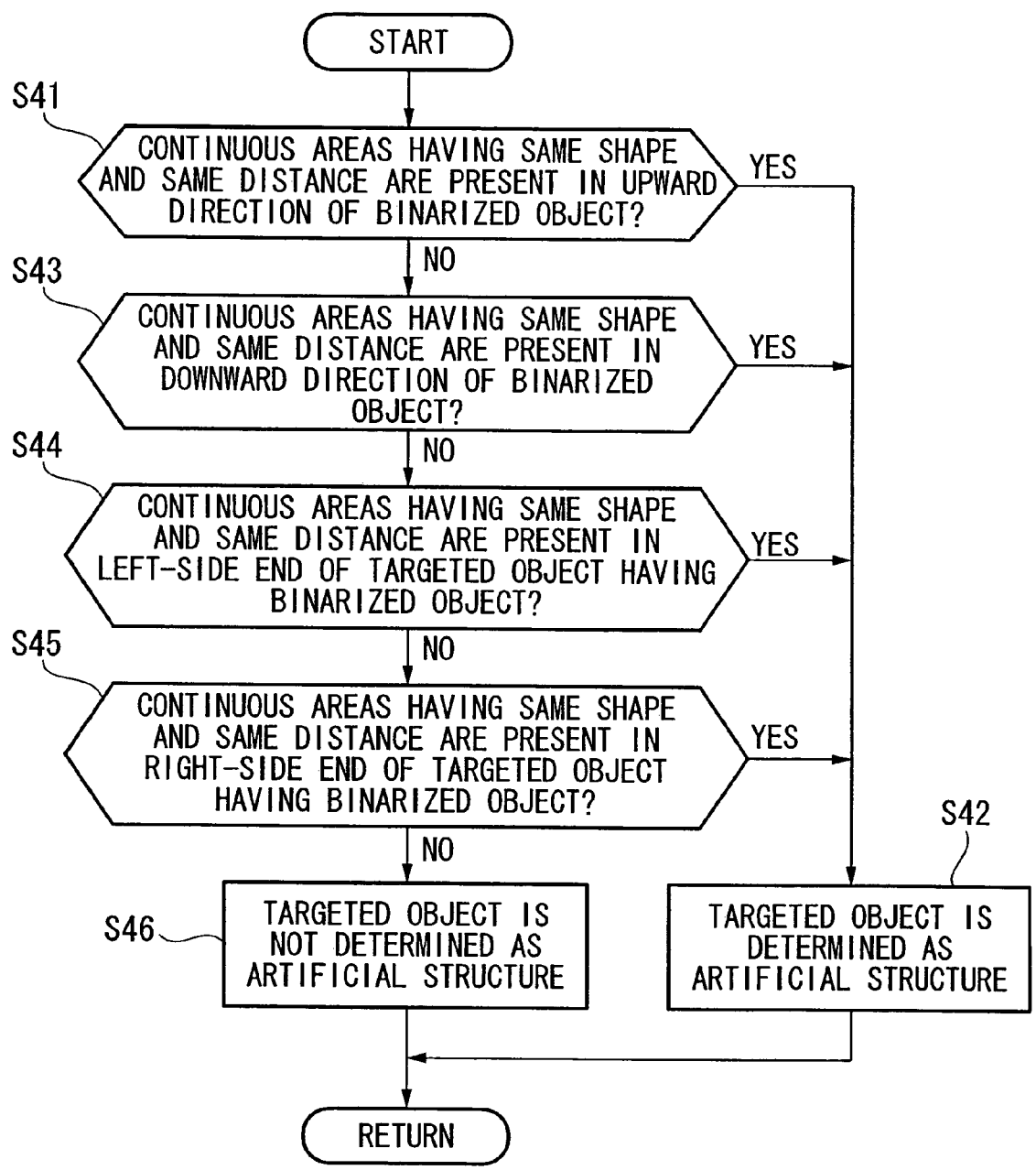
FIG. 8 is a flowchart of the artificial structure determining operation according to the present invention.

FIG. 8 is a flowchart of the artificial structure determining operation according to the present invention. In FIG. 8, the image processing unit 1 executes an upward search in which it is determined whether or not there are continuous areas having the same shape and the same distance in the upward direction of the binarized object concerned.

Upward Search 1

Figure 9:
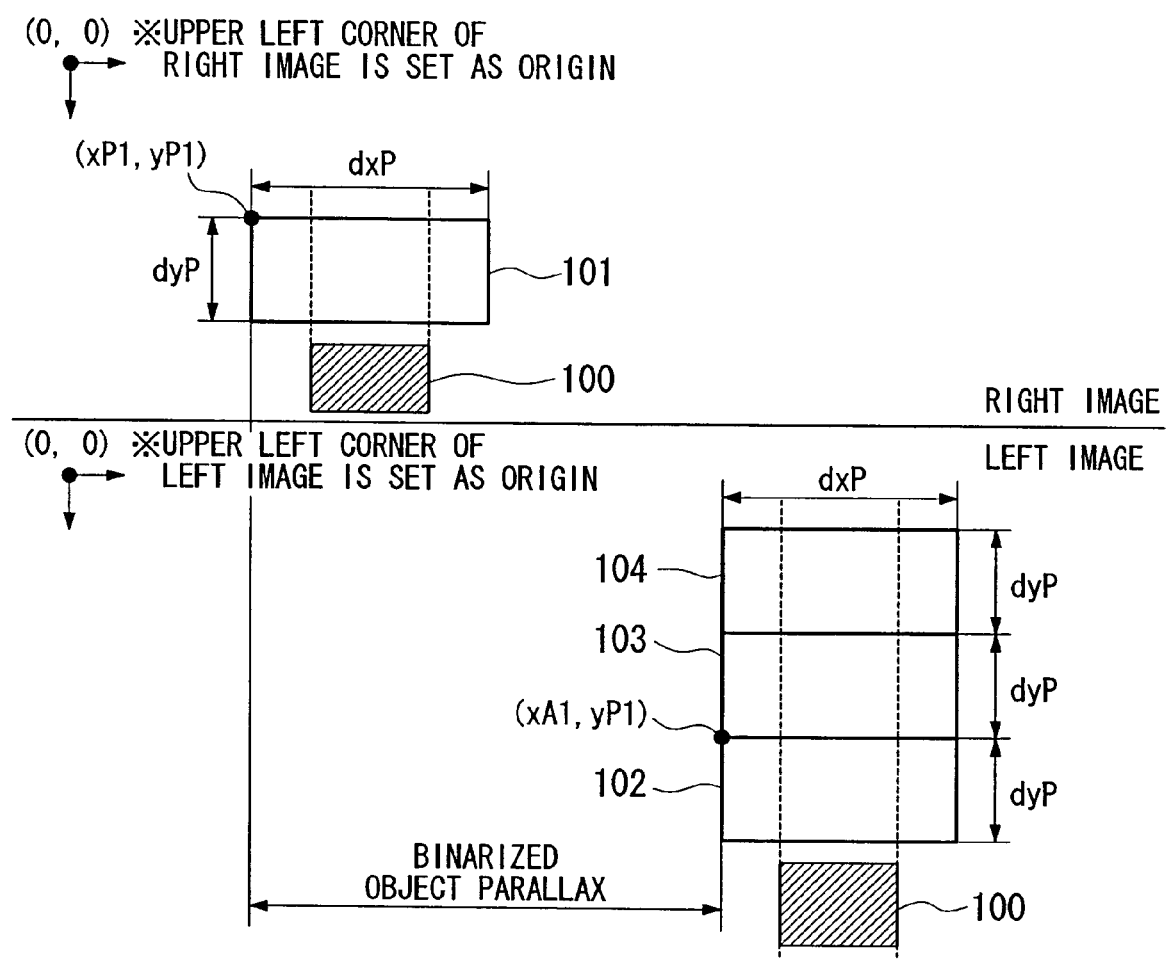
FIG. 9 is a schematic diagram illustrating of a binarization area upward search of the artificial structure determining process.

The upward search will be explained in detail with reference to FIG. 9 that shows an upward search of the binarization area. As shown in FIG. 9, the image processing unit 1 sets a reference pattern mask 101 upward of the upper end of the binarized object 100 extracted from the reference image (the right image). The reference pattern mask 101 has the upper-left starting point having a coordinate of (xP1, yP1), a width of dxP, and a height of dyP. It should be noted that the reason why the reference pattern mask 101 is set upward of the upper end of the extracted binarized object 100 is that an object that produces heat, such as a switch board provided on an utility pole or the like, are easily extracted as the binarized object 100, however, it is the utility pole around such an object that is to be extracted using the reference pattern mask 101.

Next, the image processing unit 1 sets a comparison pattern mask 102 in a region corresponding to the reference pattern mask 101 in the image to be compared (the left image), and the comparison pattern mask 102 has the upper-left starting point having a coordinate of (xA1, yP1), a width of dxP, and a height of dyP. The image processing unit 1 further sets two comparison pattern masks 103 and 104 having an X-axis coordinate of xA1, a width of dxP, and a height of dyP that are continuous to the comparison pattern masks 102 and 103, respectively, at the region corresponding to the upward direction of the reference pattern mask 101. Here, dxP, dyP, xP1, yP1, and xA1 are defined by the following formulae (1) to (6), respectively. In addition, it is assumed that the height of the pattern mask in the following formula (2) is, for example, 20 cm.

$$dxP = \text{width of the circumscribed rectangle of the binarized object} + 4 \text{ (pixel)} \quad (1)$$

$$dyP = (\text{focal length} \times \text{height of the pattern mask})/\text{binarized object distance (pixel)} \quad (2)$$

$$xP1 = \text{horizontal axis coordinate of the upper-left corner of the circumscribed rectangle of the binarized object} + \text{the width of the circumscribed rectangle of the binarized object}/2 - dxP/2 \text{ (pixel)} \quad (3)$$

$$yP1 = \text{longitudinal axis coordinate of the upper-left corner of the circumscribed rectangle of the binarized object} - 2 - dyP \text{ (pixel)} \quad (4)$$

$$\text{Binarized object parallax} = (\text{baseline length} \times \text{focal length})/\text{binarized object distance (pixel)} \quad (5)$$

$$xA1 = xP1 + \text{binarized object parallax (pixel)} \quad (6)$$

Furthermore, in order to determine the degree of correlation between the reference pattern mask 101 and the three comparison pattern masks 102, 103, and 104, the image processing unit 1 calculates the average correlation remainder values MAD1, MAD2, and MAD3 of the sums of absolute differences (SAD) between the reference pattern mask 101 and each of the three comparison pattern masks 102, 103, and 104, respectively. Here, MAD1 is the average correlation remainder value between the reference pattern mask 101 and the comparison pattern mask 102, MAD2 is the average correlation remainder value between the reference pattern mask 101 and the comparison pattern mask 103, and MAD3 is the average correlation remainder value between the reference pattern mask 101 and the comparison pattern mask 104.

Then, the image processing unit 1 determines the average correlation remainder values MAD1, MAD2, and MAD3, and determines whether or not the relationship among the average correlation remainder values MAD1, MAD2, and MAD3 satisfy the following formula (7). It should be noted that in Formula (7), MAD_MAX1 is the maximum value of the average correlation remainder values MAD1, MAD2, and MAD3, MAD_MIN1 is the minimum value of the average correlation remainder values MAD1, MAD2, and MAD3, and MAD_TH1 is a threshold value of the average correlation remainder value between gray scale images from which no binarized object is extracted.

$$MAD\_MAX1 - MAD\_MIN1 < MAD\_TH1 \quad (7)$$

When the average correlation remainder values MAD1, MAD2, and MAD3 satisfy the formula (7) and it is possible to determine that the reference pattern mask 101 and the comparison pattern masks 102, 103, and 104 are similar, in other words, there are continuous areas having the same shape and the same distance upward of the binarized object 100 (YES in step S41), the image processing unit 1 determines that the detected object is an artificial structure (step S42) and terminates the artificial structure determination process. Then, since step S35 shown in FIG. 5 results in YES, the process proceeds to step S37 in FIG. 5, in which it is determined that the object is regarded as an object not requiring an alarm to be issued.

Upward Search 2

Figure 10:
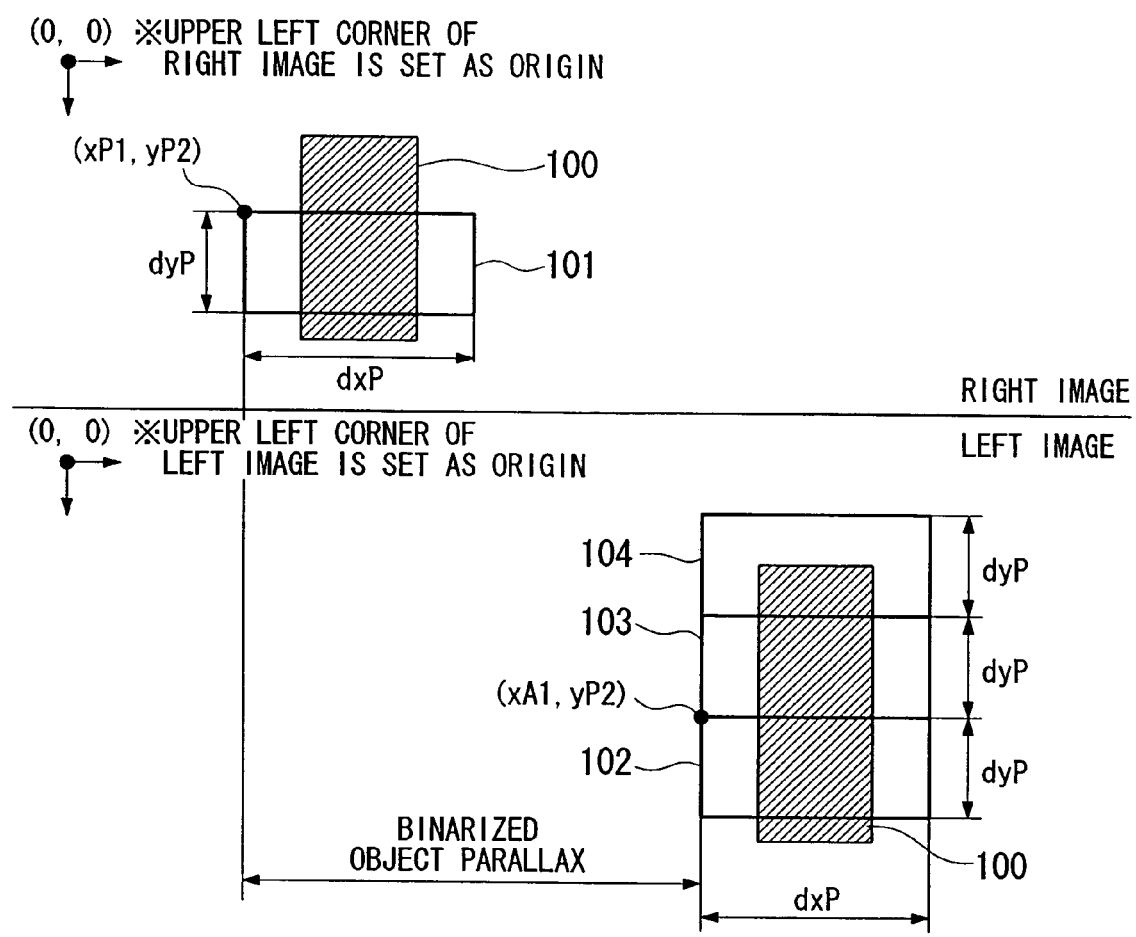
FIG. 10 is a schematic diagram illustrating of the binarization area upward search of the artificial structure determining process.

The image processing unit 1 executes another upward search in the similar manner after changing the position of the reference pattern mask 101. This upward search will be explained in detail with reference to FIG. 10 that shows an upward search of the binarization area. As shown in FIG. 10, the image processing unit 1 changes the Y-axis coordinate yP1 of the reference pattern mask 101 and the comparison pattern mask 102 to yP2, i.e., the value defined by the following formula (8), and sets the reference pattern mask 101 upward of the lower end of the binarized object 100 extracted from the reference image (the right image). Then, it determines whether or not the average correlation remainder values MAD1, MAD2, and MAD3 satisfy the following formula (9) in the same procedures as described above. It should be noted that in the formula (9), MAD_TH2 is a threshold value of the average correlation remainder value between gray scale images from which a binarized object is extracted. The reason why the reference pattern mask 101 is set at the upward direction of the lower end of the extracted binarized object 100 is to address cases where an object that is to be extracted using the reference pattern mask 101, such as a utility pole, has been extracted as the binarized object 100.

$$yP2 = \text{longitudinal axis coordinate of the lower-left corner of the circumscribed rectangle of the binarized object} - 2 - dyP \text{ (pixel)} \quad (8)$$

$$MAD\_MAX1 - MAD\_MIN1 < MAD\_TH2 \quad (9)$$

Similarly, when the average correlation remainder values MAD1, MAD2, and MAD3 satisfy the formula (9) and it is possible to determine that the reference pattern mask 101 and the comparison pattern masks 102, 103, and 104 are similar, in other words, there are continuous areas having the same shape and the same distance upward of the binarized object 100 (YES in step S41), the image processing unit 1 determines that the detected object is an artificial structure (step S42) and terminates the artificial structure determination process. Then, since step S35 shown in FIG. 5 results in YES, the process proceeds to step S37 in FIG. 5, in which it is determined that the object is regarded as an object not requiring an alarm to be issued.

On the other hand, when the average correlation remainder values MAD1, MAD2, and MAD3 satisfy neither the formula (9) nor formula (7) for both of the Y-axis coordinate yP1 and yP2 that indicate the height of the reference pattern mask 101 and the comparison pattern mask 102, and it is not possible to determine that the reference pattern mask 101 and the comparison pattern masks 102, 103, and 104 are similar in step 41, in other words, there are continuous areas having the same shape and the same distance upward of the binarized object 100 (NO in step S41), the image processing unit 1 executes a downward search in which it is determined whether or not there are continuous areas having the same shape and the same distance in the downward direction of the binarized object concerned (step S43).

Downward Search 1

Figure 11:
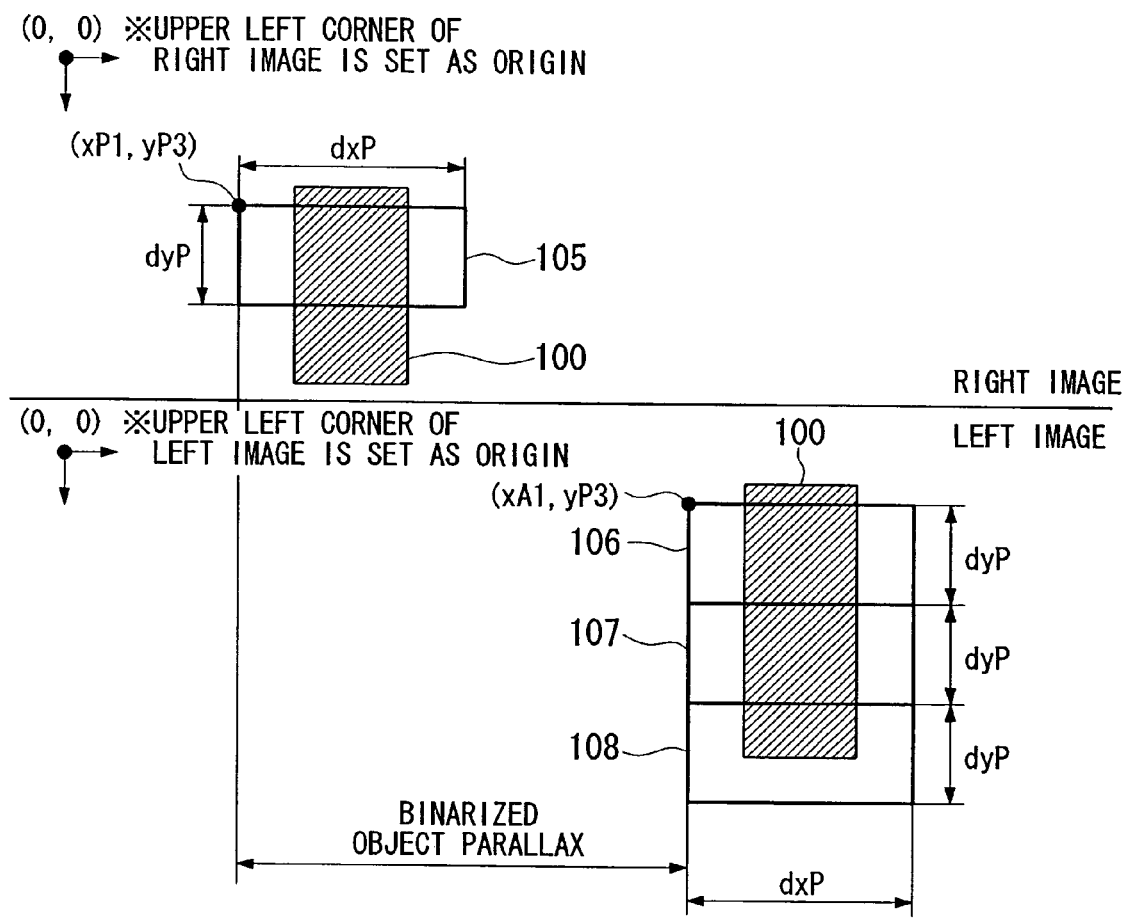
FIG. 11 is a schematic diagram illustrating of a binarization area downward search of the artificial structure determining process.

The down search will be explained in detail with reference to FIG. 11 that shows a downward search of the binarization area. As shown in FIG. 11, the image processing unit 1 sets a reference pattern mask 105 downward of the upper end of the binarized object 100 extracted from the reference image (the right image). The reference pattern mask 105 has the upper-left starting point having a coordinate of (xP1, yP3), a width of dxP, and a height of dyP. The reason why the reference pattern mask 105 is set at the downward of the upper end of the extracted binarized object 100 is to address cases where an object that is to be extracted using the reference pattern mask 105, such as a utility pole, has been extracted as the binarized object 100.

Next, the image processing unit 1 sets a comparison pattern mask 106 in a region corresponding to the reference pattern mask 105 in the image to be compared (the left image), and the comparison pattern mask 106 has the upper-left starting point having a coordinate of (xA1, yP3), a width of dxP, and a height of dyP. The image processing unit 1 further sets two comparison pattern masks 107 and 108 having an X-axis coordinate of xA1, a width of dxP, and a height of dyP that are continuous to the comparison pattern masks 106 and 107, respectively, at the region corresponding to the downward direction of the reference pattern mask 105. It should be noted that yP3 is the value expressed by the following formula (10):

$$yP3 = \text{longitudinal axis coordinate of the upper-left corner of the circumscribed rectangle of the binarized object} + 2 \text{ (pixel)} \quad (10)$$

Furthermore, in order to determine the degree of correlation between the reference pattern mask 105 and the three comparison pattern masks 106, 107, and 108, the image processing unit 1 calculates the average correlation remainder values MAD4, MAD5, and MAD6 of the SADs between the reference pattern mask 105 and each of the three comparison pattern masks 106, 107, and 108. Here, MAD4 is the average correlation remainder value between the reference pattern mask 105 and the comparison pattern mask 106, MAD5 is the average correlation remainder value between the reference pattern mask 105 and the comparison pattern mask 107, and MAD6 is the average correlation remainder value between the reference pattern mask 105 and the comparison pattern mask 108.

Then, the image processing unit 1 determines the average correlation remainder values MAD4, MAD5, and MAD6, and determines whether or not the relationship among the average correlation remainder values MAD4, MAD5, and MAD6 satisfy the following formula (11). It should be noted that in the formula (11), MAD_MAX2 is the maximum value of the average correlation remainder values MAD4, MAD5, and MAD6, and MAD_MIN2 is the minimum value of the average correlation remainder values MAD4, MAD5, and MAD6.

$$\text{MAD\_MAX2} - \text{MAD\_MIN2} < \text{MAD\_TH2} \quad (11)$$

When the average correlation remainder values MAD4, MAD5, and MAD6 satisfy the formula (11) and it is possible to determine that the reference pattern mask 105 and the comparison pattern masks 106, 107, and 108 are similar, in other words, there are continuous areas having the same shape and the same distance downward of the binarized object 100 (YES in step S43), the image processing unit 1 determines that the detected object is an artificial structure (step S42) and terminates the artificial structure determination process. Then, since step S35 shown in FIG. 5 results in YES, the process proceeds to step S37 in FIG. 5, in which it is determined that the object is regarded as an object not requiring an alarm to be issued.

Downward Search 2

Figure 12:
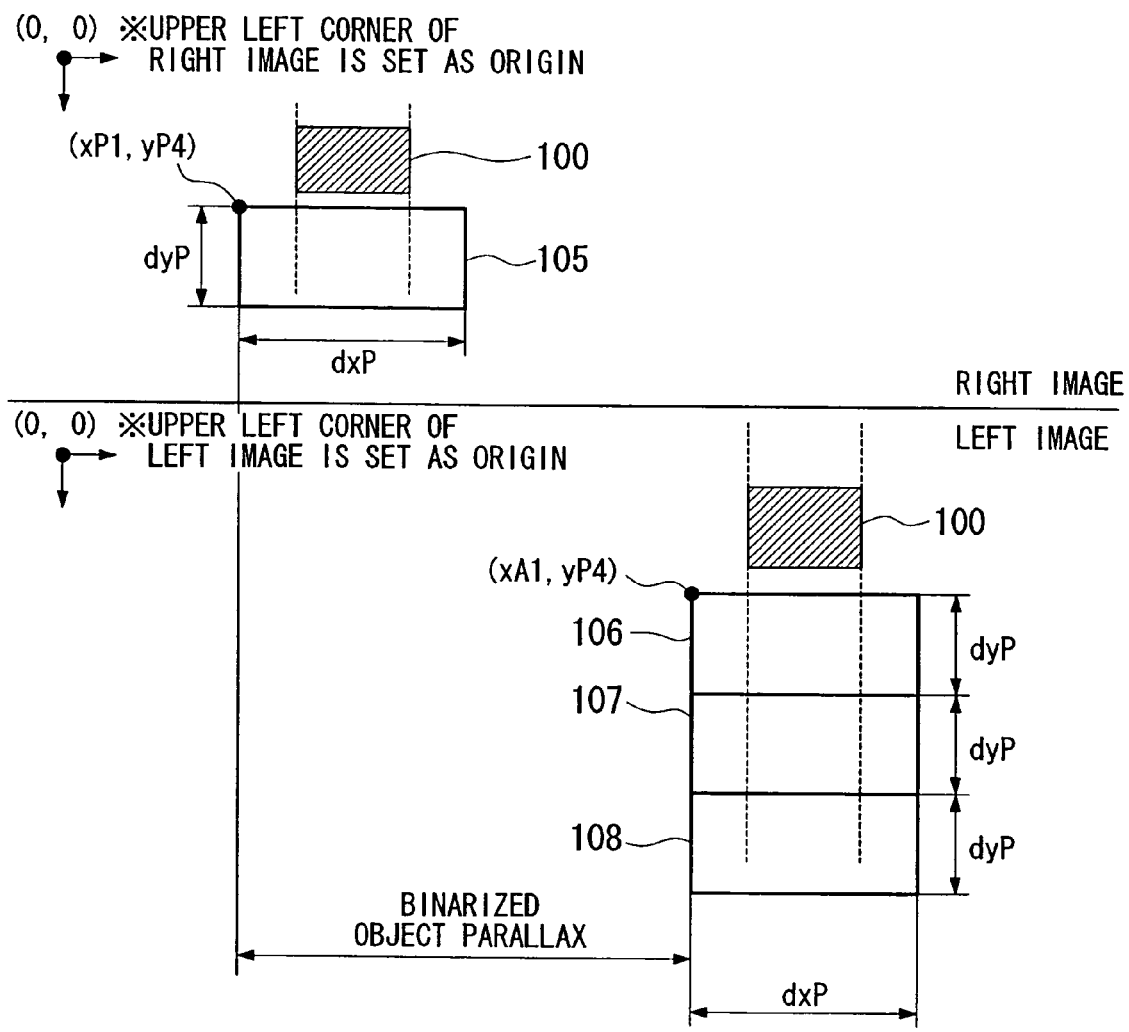
FIG. 12 is a schematic diagram illustrating of the binarization area downward search of the artificial structure determining process.

The image processing unit 1 executes another downward search in the similar manner after changing the position of the reference pattern mask 105. This downward search will be explained in detail with reference to FIG. 12 that shows a downward search of the binarization area. As shown in FIG. 12, the image processing unit 1 changes the Y-axis coordinate yP3 of the reference pattern mask 105 and the comparison pattern mask 106 to yP4, i.e., the value defined by the following formula (12), and sets the reference pattern mask 105 at the downward direction of the lower end of the binarized object 100 extracted from the reference image (the right image). Then, it determines whether or not the average correlation remainder values MAD4, MAD5, and MAD6 satisfy the following formula (13) in the same procedures as described above. It should be noted that the reason why the reference pattern mask 105 is set at the downward of the lower end of the extracted binarized object 100 is that an object that produces heat, such as a switch board provided on an utility pole or the like, are easily extracted as the binarized object 100, however, it is the utility pole around such an object that is to be extracted using the reference pattern mask 105.

$$yP4 = \text{longitudinal axis coordinate of the lower-left corner of the circumscribed rectangle of the binarized object} + 2 \text{ (pixel)} \quad (12)$$

$$\text{MAD\_MAX2} - \text{MAD\_MIN2} < \text{MAD\_TH1} \quad (13)$$

Similarly, when the average correlation remainder values MAD4, MAD5, and MAD6 satisfy the formula (13) and it is possible to determine that the reference pattern mask 105 and the comparison pattern masks 106, 107, and 108 are similar, in other words, there are continuous areas having the same shape and the same distance downward of the binarized object 100 (YES in step S43), the image processing unit 1 determines that the detected object is an artificial structure (step S42) and terminates the artificial structure determination process. Then, since step S35 shown in FIG. 5 results in YES, the process proceeds to step S37 in FIG. 5, in which it is determined that the object is regarded as an object not requiring an alarm to be issued.

On the other hand, when the average correlation remainder values MAD4, MAD5, and MAD6 satisfy neither the formula (11) nor formula (13) for both of the Y-axis Coordinate yP3 and yP4 that indicate the height of the reference pattern mask 105 and the comparison pattern mask 106, and it is not possible to determine that the reference pattern mask 105 and the comparison pattern masks 106, 107, and 108 are similar in step 43, in other words, there are continuous areas having the same shape and the same distance upward of the binarized object 100 (NO in step S43), the image processing unit 1 determines whether or not there are continuous areas having the same shape and the same distance in the left end of the binarized object concerned (step S44).

Left upward Search 1

Figure 13:
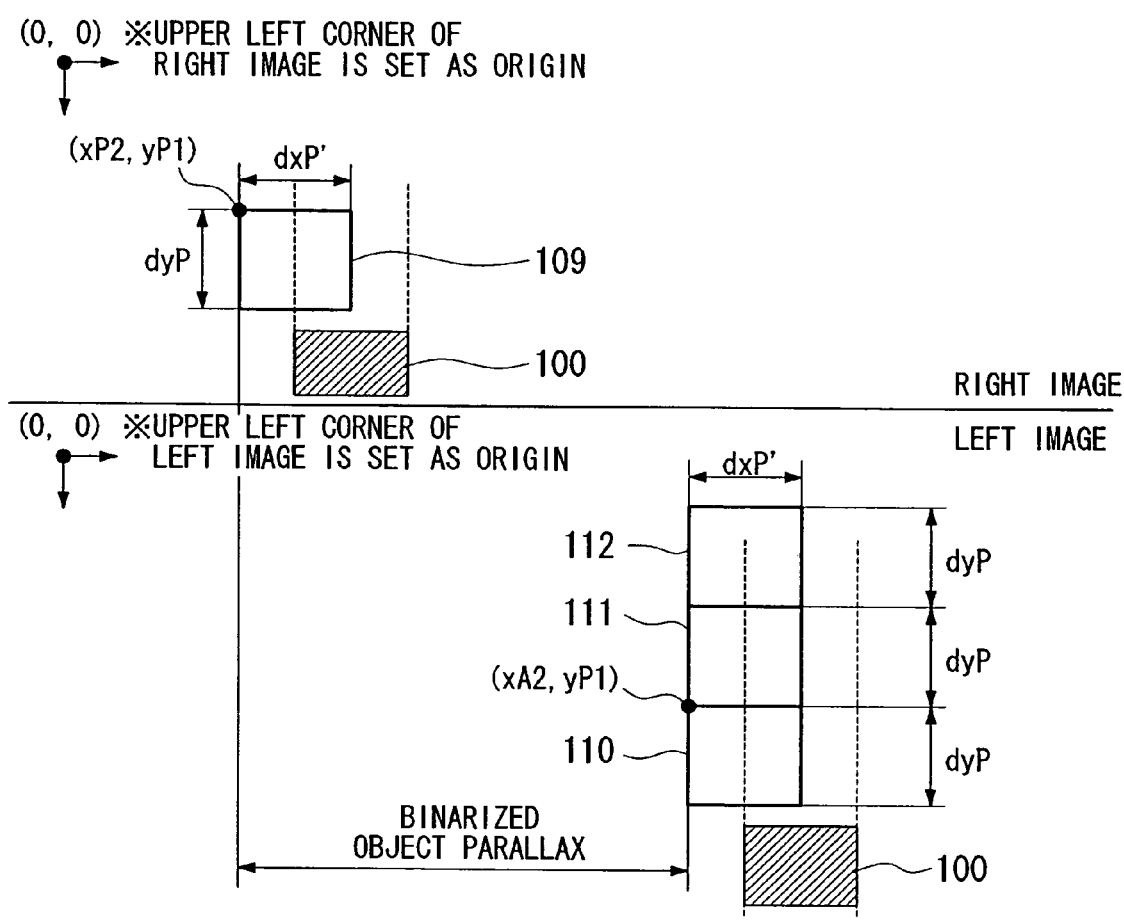
FIG. 13 is a schematic diagram illustrating of a binarization area upper left search of the artificial structure determining process.

The left upward search will be explained in detail with reference to FIG. 13 that shows an left upward search of the binarization area. As shown in FIG. 13, the image processing unit 1 sets a reference pattern mask 109 upward of the upper end of the binarized object 100 extracted from the reference image (the right image). The reference pattern mask 109 has the upper-left starting point having a coordinate of (xP2, yP1), a width of dxP', and a height of dyP. Next, the image processing unit 1 sets a comparison pattern mask 110 in a region corresponding to the reference pattern mask 109 in the image to be compared (the left image), and the comparison pattern mask 110 has the upper-left starting point having a coordinate of (xA2, yP1), a width of dxP', and a height of dyP. The image processing unit 1 further sets two comparison pattern masks 111 and 112 having an X-axis coordinate of xA2, a width of dxP', and a height of dyP that are continuous to the comparison pattern masks 110 and 111, respectively, at the region corresponding to the upward of the reference pattern mask 109.

It should be noted that dxP' is determined to be the smaller one of dxP1 and dxP2 expressed by the following formulae (14) and (15) by comparing dxP1 and dxP2. In addition, xP2 and xA2 are values defined by the following formulae (16) and (17). In addition, it is assumed that the shoulder width in the following formula (15) is, for example, 70 cm.

$$dxP1 = \text{width of the circumscribed rectangle of the binarized object} + 4 \text{ (pixel)} \quad (14)$$

$$dxP2 = (\text{focal length} \times \text{shoulder width}/2)/\text{binarized object distance (pixel)} \quad (15)$$

$$xP2 = \text{horizontal axis coordinate of the upper-left corner of the circumscribed rectangle of the binarized object} - dxP'/2 \text{ (pixel)} \quad (16)$$

$$xA2 = xP2 + \text{binarized object parallax (pixel)} \quad (17)$$

Furthermore, in order to determine the degree of correlation between the reference pattern mask 109 and the three comparison pattern masks 110, 111, and 112, the image processing unit 1 calculates the average correlation remainder values MAD7, MAD8, and MAD9 of the SADs between the reference pattern mask 109 and each of the three comparison pattern masks 110, 111, and 112. Here, MAD7 is the average correlation remainder value between the reference pattern mask 109 and the comparison pattern mask 110, MAD8 is the average correlation remainder value between the reference pattern mask 109 and the comparison pattern mask 111, and MAD9 is the average correlation remainder value between the reference pattern mask 109 and the comparison pattern mask 112.

Then, the image processing unit 1 determines the average correlation remainder values MAD7, MAD8, and MAD9, and determines whether or not the relationship among the average correlation remainder values MAD7, MAD8, and MAD9 satisfy the following formula (18). It should be noted that in the formula (18), MAD_MAX3 is the maximum value of the average correlation remainder values MAD7, MAD8, and MAD9, and MAD_MIN3 is the minimum value of the average correlation remainder values MAD7, MAD8, and MAD9.

$$\text{MAD\_MAX3} - \text{MAD\_MIN3} < \text{MAD\_TH1} \quad (18)$$

When the average correlation remainder values MAD7, MAD8, and MAD9 satisfy the formula (18) and it is possible to determine that the reference pattern mask 109 and the comparison pattern masks 110, 111, and 112 are similar, in other words, there are continuous areas having the same shape and the same distance in the left-side end of the binarized object 100 (YES in step S44), the image processing unit 1 determines that the detected object is an artificial structure (step S42) and terminates the artificial structure determination process. Then, since step S35 shown in FIG. 5 results in YES, the process proceeds to step S37 in FIG. 5, in which it is determined that the object is regarded as an object not requiring an alarm to be issued.

Left upward Search 2

Figure 14:
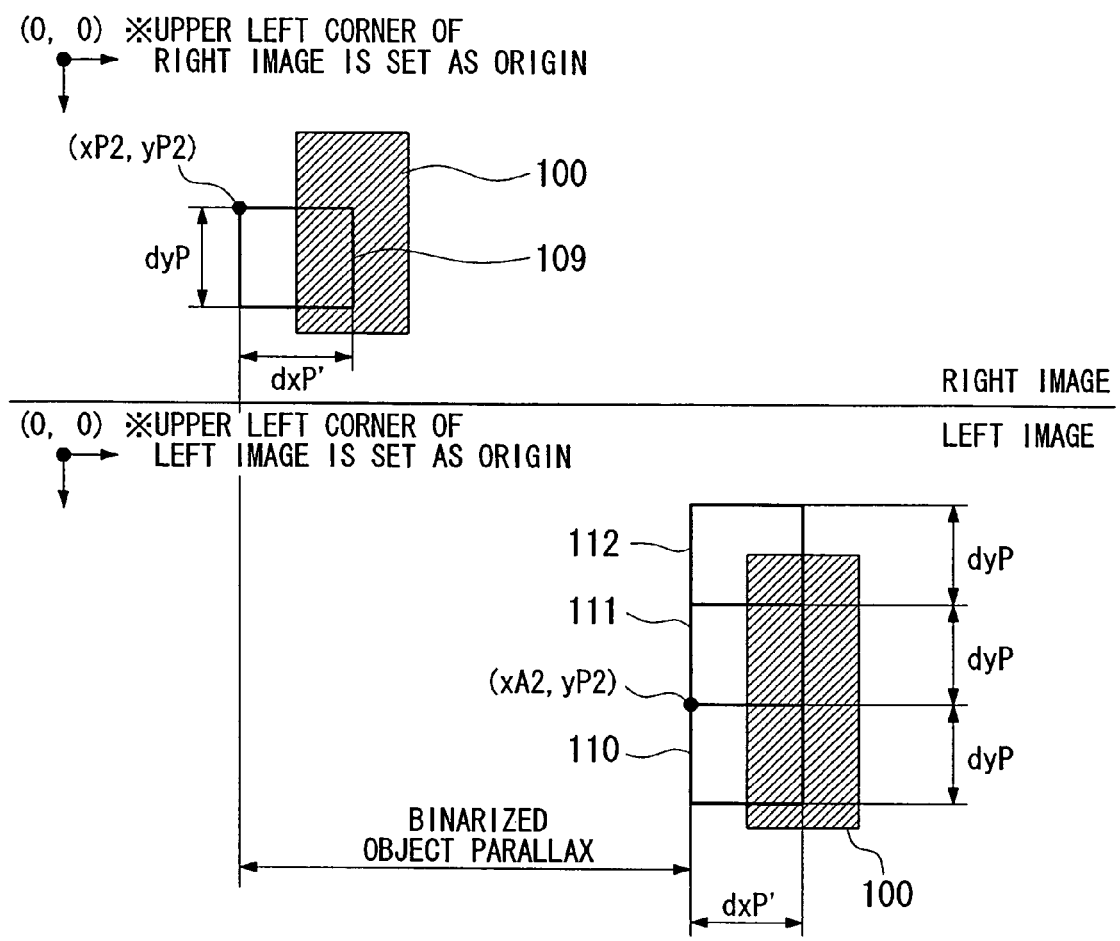
FIG. 14 is a schematic diagram illustrating of the binarization area upper left search of the artificial structure determining process.

The image processing unit 1 executes another left upward search in the similar manner after changing the position of the reference pattern mask 109. This left upward search will be explained in detail with reference to FIG. 14 that shows a left upward search of the binarization area. As shown in FIG. 14, the image processing unit 1 sets the Y-axis coordinate yP1 of the reference pattern mask 109 and the comparison pattern mask 110 to yP2, i.e., the value defined by the formula (8), and sets the reference pattern mask 109 upward of the lower end of the binarized object 100 extracted from the reference image (the right image). Then, it determines whether or not the average correlation remainder values MAD7, MAD8, and MAD9 satisfy the following formula (19) in the same procedures as described above.

$$\text{MAD\_MAX3} - \text{MAD\_MIN3} < \text{MAD\_TH2} \quad (19)$$

Similarly, when the average correlation remainder values MAD7, MAD8, and MAD9 satisfy the formula (19) and it is possible to determine that the reference pattern mask 109 and the comparison pattern masks 110, 111, and 112 are similar, in other words, there are continuous areas having the same shape and the same distance in the left-side end of the binarized object 100 (YES in step S44), the image processing unit 1 determines that the detected object is an artificial structure (step S42) and terminates the artificial structure determination process. Then, since step S35 shown in FIG. 5 results in YES, the process proceeds to step S37 in FIG. 5, in which it is determined that the object is regarded as an object not requiring an alarm to be issued.

Left downward Search 1

Figure 15:
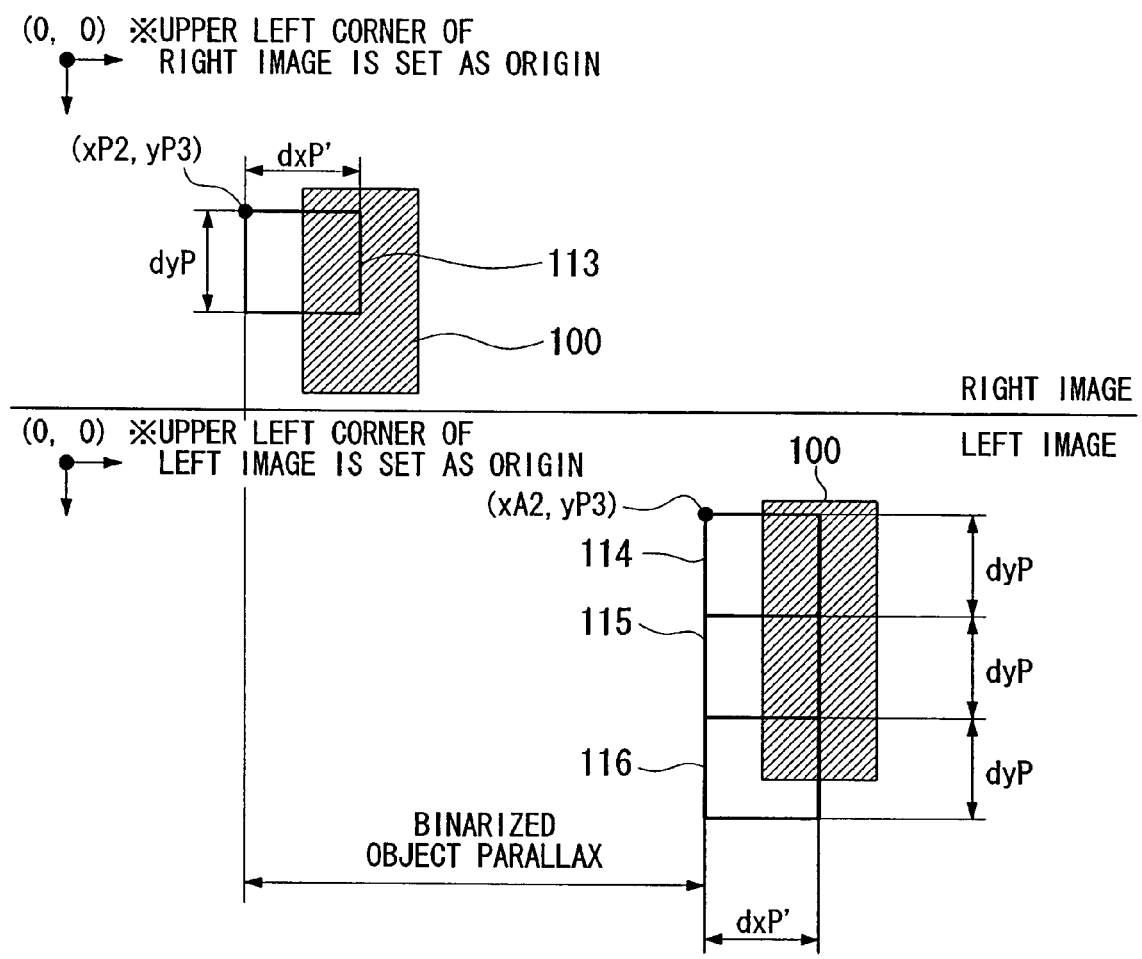
FIG. 15 is a schematic diagram illustrating of a binarization area left downward search of the artificial structure determining process.

The left downward search will be explained in detail with reference to FIG. 15 that shows a downward search of the binarization area. As shown in FIG. 15, the image processing unit 1 sets a reference pattern mask 113 downward of the upper end of the binarized object 100 extracted from the reference image (the right image). The reference pattern mask 105 has the upper-left starting point having a coordinate of (xP2, yP3), a width of dxP', and a height of dyP. Next, the image processing unit 1 sets a comparison pattern mask 114 in a region corresponding to the reference pattern mask 113 in the image to be compared (the left image), and the comparison pattern mask 114 has the upper-left starting point having a coordinate of (xA2, yP3), a width of dxP', and a height of dyP. The image processing unit 3 further sets two comparison pattern masks 115 and 116 having an X-axis coordinate of xA2, a width of dxP', and a height of dyP that are continuous to the comparison pattern masks 114 and 115, respectively, at the region corresponding to the downward direction of the reference pattern mask 113.

Furthermore, in order to determine the degree of correlation between the reference pattern mask 113 and the three comparison pattern masks 114, 115, and 116, the image processing unit 1 calculates the average correlation remainder values MAD10, MAD11, and MAD12 of the SADs between the reference pattern mask 113 and each of the three comparison pattern masks 114, 115, and 116. Here, MAD10 is the average correlation remainder value between the reference pattern mask 113 and the comparison pattern mask 114, MAD11 is the average correlation remainder value between the reference pattern mask 113 and the comparison pattern mask 115, and MAD12 is the average correlation remainder value between the reference pattern mask 113 and the comparison pattern mask 116.

Then, the image processing unit 1 determines the average correlation remainder values MAD10, MAD11, and MAD12, and determines whether or not the relationship among the average correlation remainder values MAD10, MAD11, and MAD12 satisfy the following formula (20). It should be noted that in the formula (20), MAD_MAX4 is the maximum value of the average correlation remainder values MAD10, MAD11, and MAD12, and MAD_MIN4 is the minimum value of the average correlation remainder values MAD10, MAD11, and MAD12.

$$MAD\_MAX4 - MAD\_MIN4 < MAD\_TH2 \qquad (20)$$

When the average correlation remainder values MAD10, MAD11, and MAD12 satisfy the formula (20) and it is possible to determine that the reference pattern mask 113 and the comparison pattern masks 114, 115, and 116 are similar, in other words, there are continuous areas having the same shape and the same distance in the left-side end of the binarized object 100 (YES in step S44), the image processing unit 10 determines that the detected object is an artificial structure (step S42) and terminates the artificial structure determination process. Then, since step S35 shown in FIG. 5 results in YES, the process proceeds to step S37 in FIG. 5, in which it is determined that the object is regarded as an object not requiring an alarm to be issued.

Left downward Search 2

Figure 16:
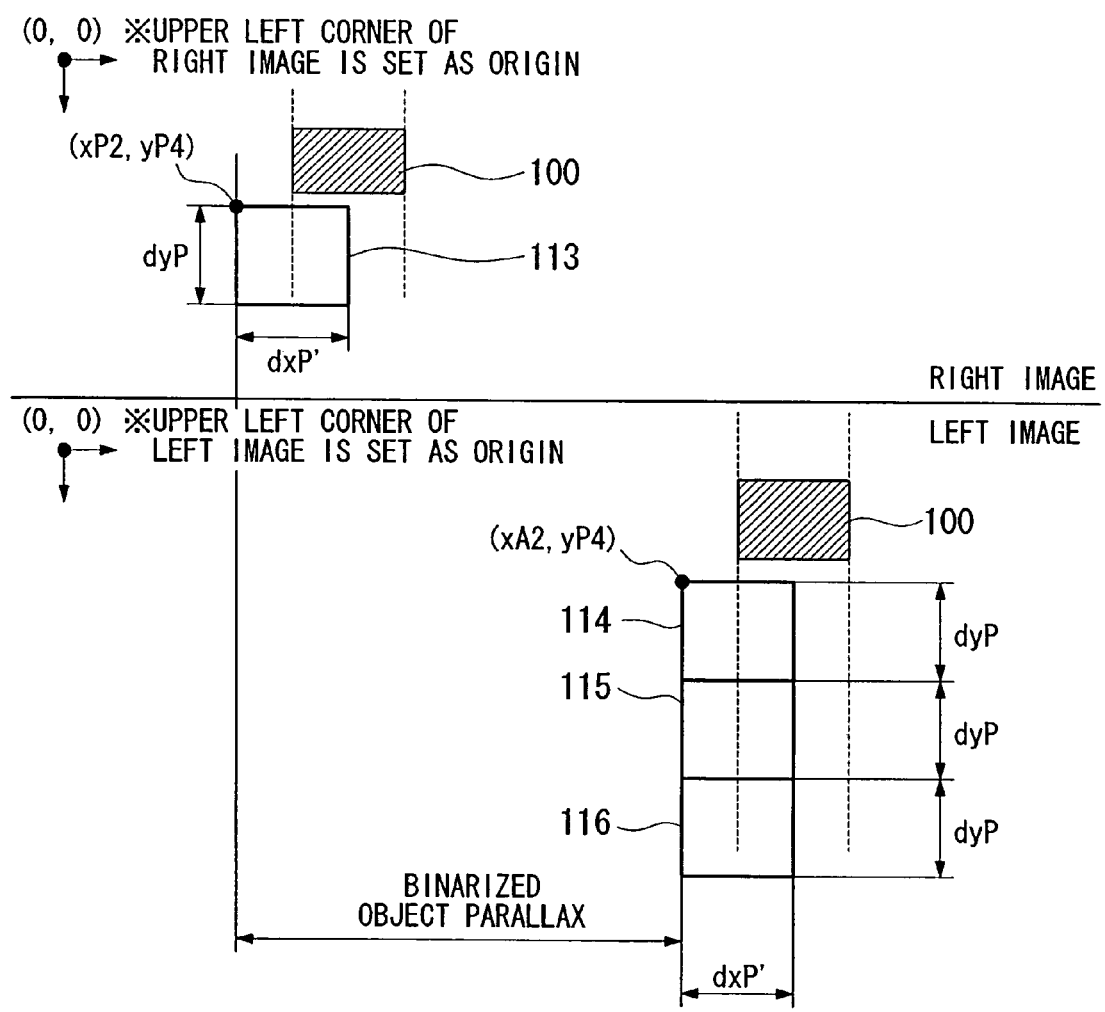
FIG. 16 is a schematic diagram illustrating of the binarization area left downward search of the artificial structure determining process.

The image processing unit 1 executes another left downward search in the similar manner after changing the position of the reference pattern mask 113. This left downward search will be explained in detail with reference to FIG. 16 that shows a left downward search of the binarization area. As shown in FIG. 16, the image processing unit 1 changes the Y-axis coordinate yP 1 of the reference pattern mask 113 and the comparison pattern mask 114 to yP4, i.e., the value defined by the formula (12), and sets the reference pattern mask 113 downward of the lower end of the binarized object 100 extracted from the reference image (the right image). Then, it determines whether or not the average correlation remainder values MAD10, MAD11, and MAD12 satisfy the following formula (21) in the same procedures as described above.

$$MAD\_MAX4 - MAD\_MIN4 < MAD\_TH1 \qquad (21)$$

Similarly, when the average correlation remainder values MAD10, MAD11, and MAD12 satisfy the formula (21) and it is possible to determine that the reference Pattern mask 113 and the comparison pattern masks 114, 115, and 116 are similar, in other words, there are continuous areas having the same shape and the same distance in the left-side end of the binarized object 100 (YES in step S44), the image processing unit 1 determines that the detected object is an artificial structure (step S42) and terminates the artificial structure determination process. Then, since step S35 shown in FIG. 5 results in YES, the process proceeds to step S37 in FIG. 5, in which it is determined that the object is regarded as an object not requiring an alarm to be issued.

On the other hand, in step S44, when the relationship between the average correlation remainder values MAD7, MAD8, and MAD9 does not satisfy the condition defined by formula (18) or (19) for both the Y-axis coordinates value of yP1 and yP2 that indicate the height of the reference pattern mask 109 and the comparison pattern mask 110, respectively, and it cannot be determined that the reference pattern mask 109 and three comparison pattern masks 110, 111, and 112 are similar; or when the relationship between the average correlation remainder values MAD10, MAD11, and MAD12 does not satisfy the condition defined by formula (20) or (21) for both the Y-axis coordinates value of yP3 and yP4 that indicate the height of the reference pattern mask 113 and the comparison pattern mask 114, respectively, and it cannot be determined that the reference pattern mask 113 and three comparison pattern masks 114, 115, and 116 are similar; in other words, there is no continuous areas having the same shape and the same distance in the left-side end of the object having the binarized object 100 (NO in step S44), the image processing unit 1 then determines whether or not there are continuous areas having the same shape and the same distance in the right-side end of the object having the binarized object 100 (step S45).

Right Upward Search and Right Downward Search

It should be noted that the processing for determining whether or not there are continuous areas having the same shape and the same distance in the right-side end of the object having the binarized object 100 is similar to the processing of step S44 for determining whether or not there are continuous areas having the same shape and the same distance in the left-side end of the object having the binarized object 100, which has been described with respect to step S44, except that the position of the reference pattern mask with respect to the binarized object 100 is reversed left to right.

More specifically, the processing of step S44 for determining whether or not there are continuous areas having the same shape and the same distance in the left-side end of the object having the binarized object 100, the position of the reference pattern mask is calculated from the horizontal axis coordinate of the upper-left corner of the circumscribed rectangle of the binarized object and the longitudinal axis coordinate of the upper-left corner of the circumscribed rectangle of the binarized object. In the processing of step S45 for determining whether or not there are continuous areas having the same shape and the same distance in the right-side end of the object having the binarized object 100, the horizontal axis coordinate of the upper-left corner of the circumscribed rectangle of the binarized object and the longitudinal axis coordinate of the upper-left corner of the circumscribed rectangle of the binarized object in each of the formulae are replaced by the horizontal axis coordinate of the upper-right corner of the circumscribed rectangle of the binarized object and the longitudinal axis coordinate of the upper-right corner of the circumscribed rectangle of the binarized object, and then the position of the reference pattern mask 109 is calculated from the horizontal axis coordinate of the upper-right corner of the circumscribed rectangle of the binarized object and the longitudinal axis coordinate of the upper-right corner of the circumscribed rectangle of the binarized object.

Similar to the processing of step S44, it is possible to determine that a reference pattern mask and three comparison pattern masks are similar, in other words, there are continuous areas having the same shape and the same distance in the right-side end of the binarized object 100 (YES in step S45), the image processing unit 1 determines that the detected object is an artificial structure (step S42) and terminates the artificial structure determination process. Then, since step S35 shown in FIG. 5 results in YES, the process proceeds to step S37 in FIG. 5, in which it is determined that the object is regarded as an object not requiring an alarm to be issued. On the other hand, in step S45, it is not possible to determine that a reference pattern mask and three comparison pattern masks are similar, in other words, there are continuous areas having the same shape and the same distance in the right-side end of the binarized object 100 (NO in step S45), the image processing unit 1 determines that the detected object is not an artificial structure (step S46) and terminates the artificial structure determination process. Then, since step S35 shown in FIG. 5 results in NO, the process proceeds to step S36 in FIG. 5, in which it is determined that the object is regarded as an object requiring an alarm to be issued.

It should be noted that in the above-described embodiment, the image processing unit 1 determines whether or not there are continuous areas having the same shape and the same distance in an object by comparing a reference pattern mask and three comparison pattern masks that are set in the upward and the downward direction of the binarized object concerned, or a region corresponding to the right-side end and the left-side end of an object having the binarized object concerned in the processing steps S41 through S46. However, the number of comparison patterns masks is not limited to three, and any number of comparison patterns masks may be set.

In addition, when a plurality of comparison pattern masks are set, the relationship among the plurality of comparison pattern masks and the reference pattern mask does not necessarily meet the conditions for continuous areas having the same shape and the same distance to be present in an object for all of the comparison pattern masks. In other words, among the plurality of comparison pattern masks, although some comparison pattern masks may be set in an image area having the object concerned, the object concerned has not been detected by the infrared camera 2L due to presence of other objects on the road. The object can be determined as an artificial structure as long as the relationship between the reference pattern mask and a predetermined ratio of comparison pattern masks or higher satisfy the conditions for determining that there are continuous areas having the same shape and the same distance in the object.

This will be explained using a specific example. The determination as of whether or not the relationship between the reference pattern mask and a predetermined ratio of comparison pattern masks or higher meets the conditions for determining that there are continuous areas having the same shape and the same distance in the object is made, for example, by setting ten comparison pattern masks, and calculating the average correlation remainder values (MADs) of the reference pattern mask and each of the comparison pattern masks in each processing shown in FIG. 8. Then, five smallest average correlation remainder values (MADs) are selected beginning from the smallest one, for example, and it is determined whether or not the difference between the maximum value and the minimum value of the selected five values satisfies each of the condition of Formulae (7), (9), (11), (13), (18), and (19).

In addition, in the above-described embodiment, the image processing unit 1 sets a plurality of comparison pattern masks in the vertical direction and determines whether or not there are continuous areas having the same shape and the same distance in an object. However, the specific direction to set the comparison pattern masks (direction to set search regions having the same shape) is not limited to the vertical direction, and any number of directions and any direction, for example, a slanting direction, may be selected in advance, or may be selected as required according to the shape of artificial structures that are expected to be present in an image around the vehicle.

In addition, in the above-described embodiment, after the pedestrian determination process is executed (step S34), the artificial structure determining process is executed (step 835) in the warning determination process shown in FIG. 5. The sequence may be reversed, and the pedestrian determination process may be executed before the artificial structure determining process. In a case where the pedestrian determination process is executed before the artificial structure determining process, an object that is once determined as a pedestrian but having characteristics only specific to an artificial structure is excluded. On the other hand, when the pedestrian determination process is executed after the artificial structure determining process, an object that is once determined as a pedestrian but having characteristics only specific to an artificial structure is excluded. It should be noted that the object excluded may be a binarized object in the binarization image, or may be a gray scale object corresponding to the binarized object in the gray scale image.

In addition, according to this embodiment, the image processing unit 1 includes a binarized object extraction device, a distance calculating device, a warning issuing device, and a pedestrian recognition device. More specifically, the processing of steps S4 through S7 in FIG. 3 corresponds to the binarized object extracting device, and the processing of step S13 in FIG. 3 corresponds to the distance calculating device, the processing of step S18 in FIG. 3 corresponds to the warning determination device, the processing of steps S19 and S20 in FIG. 3 corresponds to the warning issuing device, and the processing of step S34 in FIG. 5 corresponds to the pedestrian recognition device.

In this embodiment, the image processing unit 1 further includes an extraction region setting device, a search region setting device, a similar object extraction device, and an identical object determination device. More specifically, the processing of steps S41 through S46 in FIG. 8, the processing of setting reference pattern masks corresponds to the extraction region setting device. In the processing of steps S41 through S46 in FIG. 8, the processing of setting comparison pattern masks corresponds to the search region setting device. In the processing of steps S41 through S46 in FIG. 8, the processing of calculating average correlation remainder values corresponds to the similar object extraction device. In the processing of steps S41 through S46 in FIG. 8, the processing of determining average correlation remainder values corresponds to the identical object determination device.

As described previously, the vehicle surroundings monitoring apparatus according to this embodiment sets a reference pattern mask using the binarized object 100 extracted from the reference image (the right image) as a reference, and a plurality of comparison pattern masks corresponding to this reference pattern mask in the image to be compared (left image). Next, the reference pattern mask and the plurality of comparison pattern masks corresponding to the reference pattern mask are compared, whereby searching the upward direction of the binarized object 100. Then, when there are continuous areas having the same shape and the same distance in the upward direction of the binarized object 100, it is determined that the object is an artificial structure. In addition, in the upward direction of the binarized object 100 when there is no continuous areas having the same shape and the same distance, the downward direction of the binarized object 100 is similarly searched. Then, in the downward direction of the binarized object 100 when there are continuous areas having the same shape and the same distance, it is determined that the object is an artificial structure.

In addition, when there are no continuous areas having the same shape and the same distance in the downward direction of the binarized object 100, the region corresponding to the left-side end of the object having the binarized object 100 is searched. Then, when there are continuous areas having the same shape and the same distance in the region corresponding to the left-side end of the object having the binarized object 100, it is determined that the object is an artificial structure. Furthermore, when there are no continuous areas having the same shape and the same distance in the region corresponding to the left-side end of the object having the binarized object 100, the region corresponding to the right-side end of the object having the binarized object 100 is searched. Then, when there are continuous areas having the same shape and the same distance in the right-side end of the object having the binarized object 100, it is determined that the object is an artificial structure.

Figure 17:
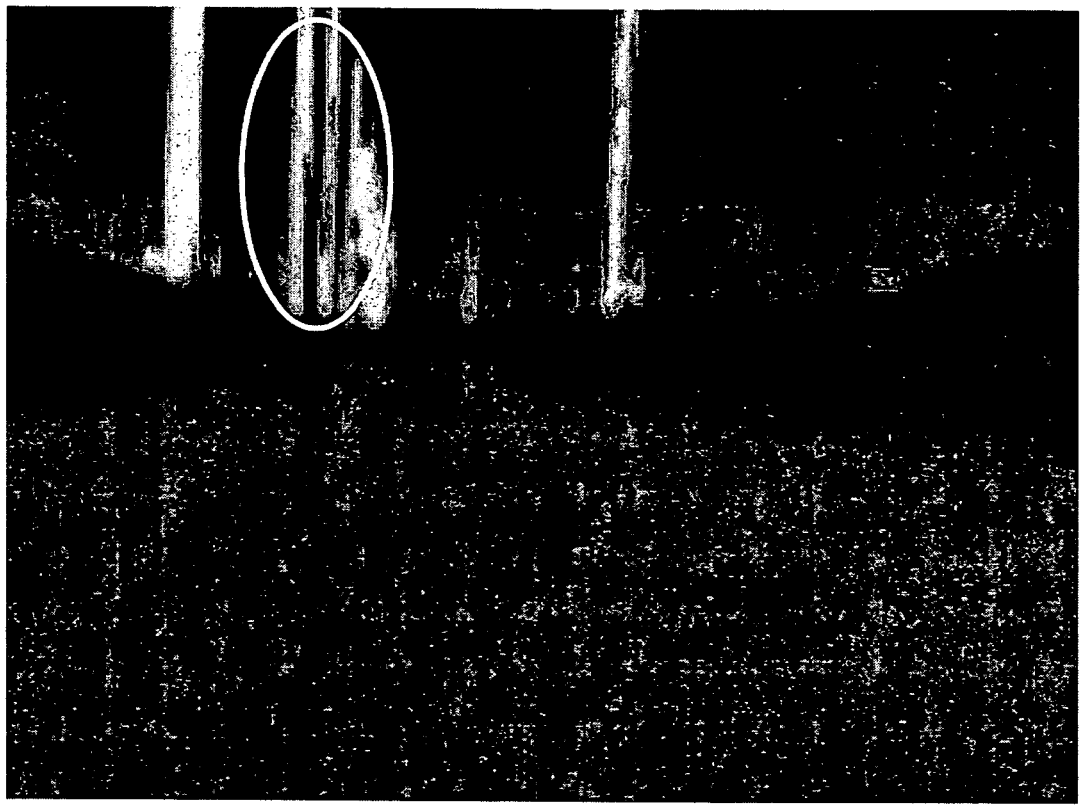
FIG. 17 is a picture showing an example of an artificial structure recognized by the vehicle surroundings monitoring apparatus according to the embodiment of the present invention.

Accordingly, a binarized object having an indefinite shape extracted from an infrared image is accurately identified, and a vehicle surroundings monitoring apparatus that is capable of extracting continuous artificial structures having the same shape in the upward direction and in the downward direction, e.g., utility poles, easily and accurately can be realized. In particular, according to the vehicle surroundings monitoring apparatus according to this embodiment, since areas having the same shape are searched around a binarized object, for example, when multiple artificial structures, e.g., utility poles, are present in series, as in the example of the artificial structure shown in FIG. 17 (the portion of FIG. 17 encircled by the white line), the artificial structure can be recognized correctly even when the combination of the object on right and left infrared images is wrongly recognized.

In addition, since multiple comparisons are executed by setting multiple comparison pattern masks, the accuracy of extracting artificial structures from objects around the vehicle can be enhanced. In particular, as long as the relationship between a predetermined ratio of comparison pattern masks or higher and the reference pattern mask satisfies the conditions for determining that there are continuous areas having the same shape and the same distance in the object, the object is determined as an artificial structure. Accordingly, continuous artificial structures having the same shape can be extracted even from an object the entire image of which has not been taken by the infrared camera 2L due to the influence of the driving state of the vehicle or the environment around the object.

In addition, when both the region corresponding to the left-side end of the binarized object 100 and the region corresponding to the right-side end of the binarized object 100 are searched, and therefore when there are continuous areas having the same shape and the same distance are in the area corresponds to either of the right-side end and the left-side end of the binarized object 100, it is determined that the object is an artificial structure. Accordingly, continuous artificial structures having the same shape can be extracted even from an object that is present only in either the right side or the left side of the images taken by the infrared camera due to the influence of the driving state of the vehicle or the environment around the object.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle surroundings monitoring apparatus, comprising:
    an infrared imaging device that captures an image;
    a binarized object extraction device that extracts a binarized object by binarizing the image;
    an extraction region setting device that sets, as an extraction region, a region adjacent to one of an upper end and a lower end of the binarized object extracted by the binarized object extraction device;
    a search region setting device that sets a search region around the extraction region;
    a similar object extraction device that, when an object having a shape similar to that of the object in the extraction region is present in the search region, extracts the object in the search region as a similar object; and
    an identical object determination device that determines whether or not the object in the extraction region and the similar object in the search region are identical.

2. A vehicle surroundings monitoring apparatus according to claim 1, further comprising:
    another infrared imaging device; and
    a distance calculating device that, based on two images captured by the two infrared imaging devices, calculates a distance to the object contained in the images,
    wherein the identical object determination device determines that the object in the extraction region and the similar object in the search region are identical when a distance to the object in the extraction region is the same as a distance to the similar object in the search region.

3. A vehicle surroundings monitoring apparatus according to claim 1, wherein the search region setting device sets a direction to search the search region to one of an upward direction, a downward direction, and upward and downward directions of the extraction region.

4. A vehicle surroundings monitoring apparatus according to claim 1, wherein the search region setting device sets a plurality of search regions in the same direction, and
    the identical object determination device, when the ratio of the number of images from which the similar object is extracted is equal to or higher than a predetermined ratio, determines that the object in the extraction region and the similar objects in the search regions are identical.

5. A vehicle surroundings monitoring apparatus according to claim 1, wherein the extraction region setting device sets a right extraction region having a horizontal coordinate of a right side end of the binarized object extracted by the binarized object extraction device and a left extraction region having a horizontal coordinate of a left side end of the binarized object, the search region setting device sets the search regions around each of the right extraction region and the left extraction region, the similar object extraction device, when an object having a similar shape as an object in the left extraction region is present within the search region corresponding to the left extraction region, or when an object having a similar shape as the object in the right extraction region is present within the search region corresponding to the right extraction region, extracts the object having the similar shape in the search region as a similar object, and the identical object determination device determines whether or not the object in the left extraction region and the similar object in the search region corresponding to the left extraction region are identical, or whether or not the object in the right extraction region and the similar object in the search region corresponding to the right extraction region are identical.

6. A vehicle surroundings monitoring apparatus according to claim 1, further comprising a pedestrian recognition device that excludes a region that contains the object that has been determined as the identical object by the identical object determination device, and recognizes a pedestrian from a binarized object in a remaining region.

7. A vehicle surroundings monitoring apparatus according to claim 6, further comprising a warning issuing device that issues a warning concerning the pedestrian recognized by the pedestrian recognition device.

8. A vehicle surroundings monitoring apparatus, comprising:

an infrared imaging device that captures an image;

a binarized object extraction device that extracts a binarized object by binarizing the image;

a pedestrian recognition device that recognizes a pedestrian in the binarized object extracted by the binarized object extraction device;

an extraction region setting device that sets, as an extraction region, a region adjacent to one of an upper end and a lower end of the binarized object extracted by the binarized object extraction device;

a search region setting device that sets a search region around the extraction region;

a similar object extraction device that, when an object having a similar shape as the object in the extraction region is present in the search region, extracts the object in the search region and sets the object as a similar object; and an identical object determination device that determines whether or not the object in the extraction region and the similar object in the search region are identical.

9. A vehicle surroundings monitoring apparatus according to claim 8, wherein the vehicle surroundings monitoring apparatus comprises two of the infrared imaging devices, and a distance calculating device that, based on two images captured by the two infrared imaging devices, calculates a distance to the object contained in the images, and the identical object determination device, when a distance to the object in the extraction region is the same as a distance to the similar object in the search region, determines that the object in the extraction region and the similar object in the search region are identical.

10. A vehicle surroundings monitoring apparatus according to claim 8, wherein the search region setting device sets the search region to one of an upward direction, a downward direction, and upward and downward directions of the extraction region.

11. A vehicle surroundings monitoring apparatus according to claim 8, the search region setting device sets a plurality of the search regions in the same direction, and the identical object determination device, when a similar object is extracted by the similar object extraction device from a predetermined ratio of the plurality of search regions or higher, determines that the object in the extraction region and the similar object in the search region are identical.

12. A vehicle surroundings monitoring apparatus according to claim 8, wherein the extraction region setting device sets a right extraction region and a left extraction region as extraction regions, each of the right extraction region and the left extraction region respectively having a horizontal coordinate of the right-side end and the left-side end of the binarized object, that has been recognized as the pedestrian by the pedestrian recognition device, the search region setting device sets the search regions around each of the right extraction region and the left extraction region, the similar object extraction device, when an object having a similar shape as an object in the left extraction region is present within the search region corresponding to the left extraction region, or when an object having a similar shape as the object in the right extraction region is present within the search region corresponding to the right extraction region, extracts the object having the similar shape in the search region as a similar object, and the identical object determination device determines whether or not the object in the left extraction region and the similar object in the search region corresponding to the left extraction region are identical, or whether or not the object in the right extraction region and the similar object in the search region corresponding to the right extraction region are identical.

13. A vehicle surroundings monitoring apparatus according to claim 8, further comprising a warning issuing device that excludes a region that contains the object that has been determined as the identical object by the identical object determination device and issues a warning concerning a pedestrian that is present in a remaining region.

* * * * *

UNITED STATES PATENT AND TRADEMARK OFFICE
CERTIFICATE OF CORRECTION

PATENT NO. : 7,436,982 B2 Page 1 of 1
APPLICATION NO. : 11/150732
DATED : October 14, 2008
INVENTOR(S) : Taniguchi et al.

It is certified that error appears in the above-identified patent and that said Letters Patent is hereby corrected as shown below:

<u>Title page</u>:
Item (75), under "Inventors:", change "Hobuharu Nagaoka" to
--Nobuharu Nagaoka--.

Signed and Sealed this

Twenty-fourth Day of March, 2009

JOHN DOLL
*Acting Director of the United States Patent and Trademark Office*